(12) United States Patent
Strandemar et al.

(10) Patent No.: US 9,835,445 B2
(45) Date of Patent: Dec. 5, 2017

(54) METHOD AND SYSTEM FOR PROJECTING A VISIBLE REPRESENTATION OF INFRARED RADIATION

(71) Applicant: FLIR Systems AB, Täby (SE)

(72) Inventors: Katrin Strandemar, Rimbo (SE); Henrik Jönsson, Stockholm (SE)

(73) Assignee: FLIR Systems AB, Taby (SE)

( * ) Notice: Subject to any disclaimer, the term of this patent is extended or adjusted under 35 U.S.C. 154(b) by 593 days.

(21) Appl. No.: 14/473,976

(22) Filed: Aug. 29, 2014

(65) Prior Publication Data

US 2014/0368641 A1 Dec. 18, 2014

Related U.S. Application Data

(63) Continuation of application No. PCT/EP2013/054082, filed on Feb. 28, 2013.

(30) Foreign Application Priority Data

Feb. 29, 2012 (EP) .................................... 12157535

(51) Int. Cl.

| | |
|---|---|
| *H04N 5/232* | (2006.01) |
| *G01B 11/25* | (2006.01) |
| *H04N 5/33* | (2006.01) |
| *H04N 5/74* | (2006.01) |
| *G06T 3/00* | (2006.01) |
| *H04N 9/31* | (2006.01) |

(Continued)

(52) U.S. Cl.
CPC ............ *G01B 11/254* (2013.01); *G03B 17/54* (2013.01); *G03B 42/00* (2013.01); *G06T 3/00* (2013.01); *H04N 5/265* (2013.01); *H04N 5/33* (2013.01); *H04N 5/74* (2013.01); *H04N 9/3185* (2013.01); *H04N 9/3194* (2013.01)

(58) Field of Classification Search
CPC ............. H04N 5/33; H04N 5/20; G01B 11/14
USPC ........................................................ 348/136
See application file for complete search history.

(56) References Cited

U.S. PATENT DOCUMENTS

| | | | |
|---|---|---|---|
| 5,414,439 A | 5/1995 | Groves et al. | |
| 7,083,327 B1 * | 8/2006 | Shepard | G01N 25/72 374/124 |

(Continued)

FOREIGN PATENT DOCUMENTS

| | | |
|---|---|---|
| CN | 1546960 | 11/2004 |
| CN | 1880950 | 12/2006 |

(Continued)

OTHER PUBLICATIONS

Wikipedia, "Zilog Z80", http://en.wikipedia.org/w/index.php?title=Zilog_Z80&oldid=474910840 Feb. 4, 2012, 8 pages.

(Continued)

*Primary Examiner* — Tung Vo
(74) *Attorney, Agent, or Firm* — Haynes and Boone, LLP

(57) ABSTRACT

A method for enabling easier interpretation and analysis of an observed real world scene by presenting a visible representation of infrared (IR) radiation information, based on IR radiation emitted from said real world scene, and additional information onto said observed real world scene, using thermography arrangement comprising an IR imaging system, a visible light imaging system and a visible light projecting system.

22 Claims, 15 Drawing Sheets

(51) Int. Cl.
*H04N 5/265* (2006.01)
*G03B 17/54* (2006.01)
*G03B 42/00* (2006.01)

(56) References Cited

U.S. PATENT DOCUMENTS

| | | | | |
|---|---|---|---|---|
| 7,084,405 | B1* | 8/2006 | Malyutenko | H04N 5/33 250/370.08 |
| 8,374,438 | B1* | 2/2013 | Wagner | H04N 5/33 250/330 |
| 9,538,880 | B2* | 1/2017 | Riefenstein | F24C 7/085 |
| 9,565,373 | B2 | 2/2017 | Strandemar et al. | |
| 2002/0030163 | A1* | 3/2002 | Zhang | G02B 23/125 250/330 |
| 2003/0133132 | A1* | 7/2003 | Kiermeier | G01B 11/14 356/624 |
| 2003/0149347 | A1* | 8/2003 | Kauffmann | A61B 5/0002 600/310 |
| 2004/0001184 | A1* | 1/2004 | Gibbons | H04N 5/20 353/31 |
| 2004/0021773 | A1* | 2/2004 | Hayakawa | G01J 5/02 348/164 |
| 2004/0071367 | A1* | 4/2004 | Irani | G06T 7/20 382/284 |
| 2004/0169617 | A1* | 9/2004 | Yelton | G06T 15/04 345/1.1 |
| 2004/0225222 | A1* | 11/2004 | Zeng | A61B 1/043 600/476 |
| 2004/0264542 | A1* | 12/2004 | Kienitz | G01J 5/02 374/120 |
| 2005/0040333 | A1 | 2/2005 | Fleury et al. | |
| 2006/0208169 | A1* | 9/2006 | Breed | B60N 2/002 250/221 |
| 2006/0289772 | A1* | 12/2006 | Johnson | G01C 3/08 250/370.08 |
| 2007/0235634 | A1* | 10/2007 | Ottney | G01J 5/02 250/214 VT |
| 2008/0045804 | A1* | 2/2008 | Williams | A61B 5/112 600/300 |
| 2009/0008558 | A1* | 1/2009 | Strandemar | H04N 3/1593 250/339.05 |
| 2009/0010633 | A1* | 1/2009 | Strandemar | G01S 17/023 396/121 |
| 2009/0010635 | A1* | 1/2009 | Strandemar | G02B 23/12 396/133 |
| 2009/0050806 | A1* | 2/2009 | Schmidt | H04N 5/2254 250/332 |
| 2009/0100096 | A1* | 4/2009 | Erlichson | H04L 67/02 |
| 2009/0250611 | A1* | 10/2009 | Strandemar | H04N 5/33 250/330 |
| 2010/0045809 | A1* | 2/2010 | Packard | H04N 5/2258 348/222.1 |
| 2011/0125028 | A1 | 5/2011 | Wood et al. | |
| 2011/0175983 | A1 | 7/2011 | Park et al. | |
| 2011/0262032 | A1 | 10/2011 | Gu | |
| 2012/0257049 | A1* | 10/2012 | Schnell | H04N 5/33 348/135 |
| 2015/0018691 | A1* | 1/2015 | Stepien | A61B 5/0091 600/474 |
| 2015/0110152 | A1* | 4/2015 | Rentmeister | G01J 5/505 374/121 |

FOREIGN PATENT DOCUMENTS

| | | |
|---|---|---|
| CN | 101796818 | 8/2010 |
| DE | 10 2005 058018 | 6/2007 |
| EP | 2177163 | 4/2010 |
| WO | WO 2007/005018 | 1/2007 |

OTHER PUBLICATIONS

Brundage, Barbara, "Photoshop Elements 3 The Missing Manual", First Edition, O'Reilly Media, Inc., Sebastopol, CA, Jan. 1, 2005, 4 pages.

* cited by examiner

1

METHOD AND SYSTEM FOR PROJECTING A VISIBLE REPRESENTATION OF INFRARED RADIATION

CROSS-REFERENCE TO RELATED APPLICATIONS

This patent application is a continuation of International Patent Application No. PCT/EP2013/054082 filed Feb. 28, 2013, which claims the benefit of European Patent Application No. 12157535.1 filed Feb. 29, 2012, all of which are hereby incorporated by reference in their entirety.

TECHNICAL FIELD

One or more embodiments of the present invention relate generally to a method and a system for enabling easier interpretation and analysis of an observed real world scene.

More specifically, one or more embodiments of the present invention relate to enabling easier interpretation and analysis of an observed real world scene by projecting visible light onto the observed real world scene, wherein the visible light comprises a visible representation of infrared (IR) radiation emitted from the observed real world scene and a visible representation of additional information.

Furthermore, one or more embodiments of the present invention relates to methods and systems for projecting said visible light onto an observed real world scene, wherein the projected visible light is aligned with the IR radiation emitted from the real world scene and wherein the projected visible light comprises a representation of IR radiation information based on IR radiation from the observed real world scene.

BACKGROUND

Within the field of infrared (IR) imaging, or thermal imaging, it is common to capture IR radiation emitted from an observed real world scene with an IR imaging system, also referred to as a thermography arrangement, e.g. in the form of an IR camera, and to process the IR radiation information into a visible light image that is typically shown to a user on a display of the system.

A problem with this is that it is difficult for a user of the imaging system to discern and analyze what is being shown on the display, since the image representing the IR radiation information often has a low resolution and the display unit typically is quite small.

The user of the IR imaging system may choose to save one or more images and transfer them to another unit, such as a computer, for later display. In this way, the one or more images may be presented on a larger display. However, this leads to a delay from the moment when the IR radiation is detected to the moment when the detected information is presented to the user. In other words, the analysis of the detected information may not be performed on site. Furthermore, it may be hard for the user to retrospectively relate the information displayed on a computer display to the observed real world scene where the IR radiation detection has been performed.

In a typical use case of an IR camera an operator would like to analyze the characteristics of one or more objects or surfaces in an observed real world scene by detecting the temperature of different points or parts of the object. The operator captures an IR image and then compares the IR image of the observed real world scene with the observed real world scene as perceived by the human eye. In this process the operator has to translate or interpret the image information to the reality by comparing what is displayed on a typically small display of the IR camera with the observed real world scene, in order to understand how the image information on the display relates to the observed real world scene, with the entailing effort, error source and delay there may be.

Some pieces of related art address these problems by providing a combination of an IR detector or IR camera and a visible light projector that enables display of a larger visible image on site, the visible image being projected for instance onto a flat surface of the observed real world scene. This related art is devised to generate a visible light image dependent on the IR radiation and to project a visible interpretation of the IR radiation directly onto the observed real world scene. Thereby it is made possible to use the IR radiation information in a more close connection to the observed real world scene.

The production of projection devices of small sizes is becoming increasingly common as the technology advances and smaller construction components are available. Such "miniature" projectors may therefore for example be used in combination with handheld devices, such as mobile communication devices with imaging capabilities or imaging systems. This development makes it more feasible also to produce handheld IR cameras with a projector. However, in related art there remains to develop the methods for integrating an IR camera with a projector.

Since the capturing of IR information in the form of an IR image and the projection of a visual image that is a visual representation of the IR image are performed by different and physically separated components, the optical axes of the components are typically at a distance from each other and an optical phenomenon known as parallax error will arise. To compensate for the parallax error, the images must be aligned. Traditionally alignment is achieved by adaptation of optical elements in the imaging system, for instance focus lenses or beam splitters. Alignment using optical or other physical elements in the imaging system requires space in the imaging systems and may be hard to fit. Furthermore, the inclusion of additional or specially adapted elements in the imaging system renders a higher production cost.

Thus, there exists a need for enabling easier interpretation and analysis of an observed real world scene, preferably on site, or live, during use of a thermography arrangement and to relate additional information to an observed real world scene.

SUMMARY

One or more embodiments of the present disclosure are directed to enabling a user of a thermography arrangement easier interpretation and analysis of an observed real world scene.

Various techniques are disclosed according to one or more embodiments to solve the following partial problems:

How to provide easier interpretation and analysis of an observed real world scene preferably on site, or live, during use of a thermography arrangement.

How to help a user relate additional information to an observed real world scene.

One or more embodiments of the present invention solve or at least minimize the problems mentioned above.

One or more embodiments of the present invention may enhance the experience for a user using a combined IR imaging device and projector.

One or more embodiments of the present invention may facilitate easier analysis and interpretation of projected information for a user using a combined IR imaging device and projector.

One or more embodiments of the present invention may facilitate easier interpretation and analysis of an observed real world scene by presenting a visible representation of infrared (IR) radiation information, based on infrared (IR) radiation emitted from said real world scene and additional information onto said observed real world scene, using a thermography arrangement 10 comprising an infrared (IR) imaging system 18, a visible light imaging system 14 and a visible light projecting system.

Furthermore, one or more embodiments described herein may provide easier interpretation and analysis of an observed real world scene preferably on site, or live, during use of a thermography arrangement.

Furthermore, one or more embodiments described herein may help a user relate additional information to an observed real world scene.

One or more embodiments of the present disclosure solve or at least minimize the problems mentioned above.

According to various embodiments, there are provided methods and thermography arrangements for projecting a visible representation onto an observed real world scene, wherein the projected visible representation comprises a visible representation of IR information, based on infrared (IR) radiation emitted from the observed real world scene and is projected onto the observed real world scene in alignment with the detected IR radiation emitted from the observed real world scene, thereby for example enhancing or highlighting information present in the observed real world scene, and/or helping a user relate the projected information to the observed real world scene. According to embodiments, the projected visible representation further comprises a visible representation of additional information that further enhances the user experience by enabling easier interpretation and analysis of the observed real world scene as more information. The additional information may be related to the observed real world scene or its surroundings, or it may show for example measurement related information or other information that helps a user interpret the observed real world scene with regards to area, sizes, distances, etc.

According to a further embodiment, a projection of a visible representation may be provided that is correctly aligned with detected IR radiation emitted from the observed real world object, objects or observed real world scene onto which the visible representation is projected by means of visible light.

According to various embodiments, a projection of a visible representation may be provided that comprises additional information projected onto an object or objects in the observed real world scene. According to embodiments, the additional information is projected onto the observed real world scene to scale, thereby further helping the user relate the additional information to the observed real world scene.

According to one embodiment, there is provided a method for enabling easier interpretation and analysis of an observed real world scene by presenting a visible representation of infrared (IR) radiation information, based on infrared (IR) radiation emitted from said real world scene, and additional information onto said observed real world scene in alignment with the detected infrared (IR) radiation emitted from said observed real world scene, using a thermography arrangement comprising an infrared (IR) imaging system, a visible light imaging system and a visible light projecting system, the method comprising: detecting infrared (IR) radiation emitted from said observed real world scene as infrared (IR) radiation information or in more specific words capturing infrared (IR) radiation information based on detected infrared (IR) radiation emitted from said observed real world scene; creating a visible representation of said detected infrared (IR) radiation information; aligning said visible representation of said detected infrared (IR) radiation information to the detected infrared (IR) radiation emitted from said observed real world scene; creating a visible representation of additional information dependent on a signal received from a predetermined source; creating a combined infrared (IR) image comprising said aligned visible representation of said detected infrared (IR) information and said visible representation of additional information; and presenting said combined infrared (IR) image by projecting it onto said observed real world scene, wherein said visible representation of detected infrared (IR) information comprised in said infrared (IR) image is projected in alignment with the detected IR radiation emitted from the observed real world scene.

According to another embodiment, there is provided a thermography arrangement for enabling easier interpretation and analysis of an observed real world scene by presenting a visible representation of infrared (IR) radiation information, based on infrared (IR) radiation emitted from said real world scene, and additional information onto an observed real world scene in alignment with the detected IR radiation emitted from said observed real world scene, wherein the visible representation of infrared (IR) radiation information comprised in said infrared combined (IR) image is projected in alignment with the infrared (IR) radiation emitted from the observed real world scene, the arrangement comprising: an infrared (IR) imaging system for detecting infrared (IR) radiation emitted from said observed real world scene according to a first field of view; a visible light projecting system adapted to project visible light onto said observed real world scene according to a second field of view, at least partially overlapping the first field of view; a visible light imaging system adapted to capture a visible light image of said observed real world scene, according to a third field of view, the third field of view at least partially overlapping the first and/or second field of view; a processor adapted to:
  create a visible representation of said detected infrared (IR) radiation information;
  align said visible representation of said detected infrared (IR) radiation information to the detected infrared (IR) radiation emitted from said observed real world scene;
  create a visible representation of additional information dependent on a signal received from a predetermined source; and
  create a combined infrared (IR) image comprising said aligned visible representation of said detected infrared (IR) radiation information and said visible representation of additional information;
wherein said visible light projecting system 22 is further adapted to:
  present said combined infrared (IR) image by projecting it onto said observed real world scene, wherein the visible representation of detected infrared (IR) radiation information comprised in the infrared (IR) image is projected in alignment with the detected IR radiation emitted from the observed real world scene.

According to other embodiments, there are provided a computer-readable medium on which is stored non-transitory information adapted to control a processor to perform any of the method steps or functions described herein; or a computer program product comprising code portions adapted to control a processor to perform any of the method steps or functions described herein and/or configuration data adapted to configure a Field-programmable gate array (FPGA) to perform any of the method steps or functions described herein.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

The present invention is further described below by way of exemplifying embodiments with reference to the accompanying drawings, in which.

DETAILED DESCRIPTION

Introduction

Figure 1A:
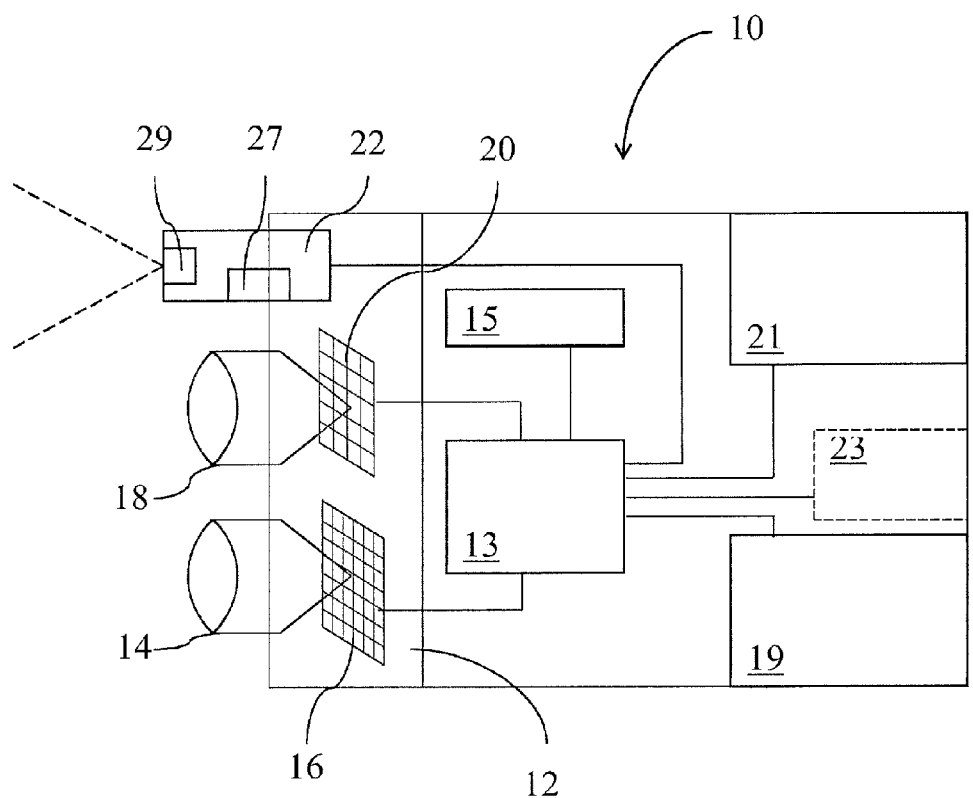
FIGS. 1A-1C show schematic views of a thermography arrangement according to different exemplifying embodiments of the invention.

Embodiments of the present invention thus relates to solutions for IR (infrared) imaging, also referred to as thermography imaging, where instead of or in addition to indirect view on a display arrangement as is the common case with IR imaging arrangements, or thermography arrangements, a visible representation of infrared (IR) radiation information, based on infrared (IR) radiation emitted from the scene and a visible representation of additional information are superimposed onto the observed real world scene using a projection of visible representation in real time or live (near real time), i.e. with a short delay from detection of infrared (IR) radiation information to the projection of a visible representation of the infrared (IR) radiation information onto said observed real world scene. This means that a user can use his or her normal vision to observe an observed real world scene wherein the visible representation projected onto the observed real world scene makes it easier for the user to interpret and/or analyze the observed real world scene. For instance, the projected visible representation may highlight objects or areas of interest in the observed real world scene. According to embodiments, the additional information is projected onto the observed real world scene to scale, thereby further helping the user relate the additional information to the observed real world scene.

According to embodiments additional information relating to the observed real world scene is received as predetermined information, received from a sensor integrated in or coupled to the thermography arrangement, received from a measuring device in or coupled to the thermography arrangement 10, received from a memory in the thermography arrangement, received from a graphical user interface (GM) integrated in or coupled to the thermography arrangement 10 or received from a processor in the thermography arrangement.

According to embodiments a distance value z from the thermography arrangement 10 to the observed real world scene is retrieved. According to embodiments projecting additional information onto the observed real world scene to scale involves projecting adapted additional information onto the observed real world scene based on a retrieved distance value z from the thermography arrangement to the observed real world scene. According to embodiments a distance value z from the thermography arrangement 10 to the observed real world scene is retrieved. According to embodiments the retrieved distance value z is predetermined, retrieved from the memory, retrieved by calculation using relationships with known parameter and/or parameters that the thermography arrangement is enabled to retrieve, for instance the relationship of Eq. 2 presented in relation to FIGS. 2-8 or retrieved by use of a distance sensor integrated in or coupled to the thermography arrangement.

In embodiments multiple distance values z from the thermography arrangement 10 to the observed real world scene is retrieved in a manner described in relation to FIGS. 2-8.

In embodiments the length or area of a part of the additional information projected onto the observed real world scene is calculated based on the retrieved distance value z.

According to embodiments projecting additional information onto the observed real world scene to scale involves projecting the visible representation of additional information onto the observed real world scene to scale, dependent on the retrieved distance z or the calculated at least one distance and/or area.

According to embodiments projecting additional information onto the observed real world scene to scale involves projecting relative length/area information as additional information, helping a user to relate sizes/areas/distances of different parts of or objects present in the scene to each other. In one non-limiting example the relative length information is in the form of a ruler. In one non-limiting example the relative area information is in the form of a help grid or grid lines. In one non-limiting example the relative length/area information is determined based on a retrieved distance from the thermography arrangement to the observed real world scene.

According to embodiments projecting additional information onto the observed real world scene to scale involves projecting orientation information as additional information, helping a user to relate the orientation of different parts of or objects present in the scene to each other. In one non limiting example the orientation information is indicating horizontal and/or vertical orientation, for example obtained from a gyroscope integrated in or coupled to the thermography arrangement. In one non-limiting example the orientation information is in the form of a line level, spirit level, or bubble level or any other indicators used in the art to indicate whether the orientation of objects in the observed real world scene is horizontal (level) or vertical.

According to embodiments projecting additional information onto the observed real world scene to scale involves projecting text information as additional information. In one non-limiting example the text information is temperature values obtained from a sensor, humidity values obtained from a sensor or levels obtained from the detected IR radiation information, in manners known in the art. The text information may be comprised in the IR image projected onto the observed scene as numeric values or intervals or as any other suitable visible representation that will aid a user in interpreting or analyzing the observed scene.

According to embodiments projecting additional information onto the observed real world scene to scale involves projecting graphical information as additional information. In one non-limiting example the graphical information comprises a sketch, a drawing, or any graphical information related to the observed real world scene.

Figure 1B:
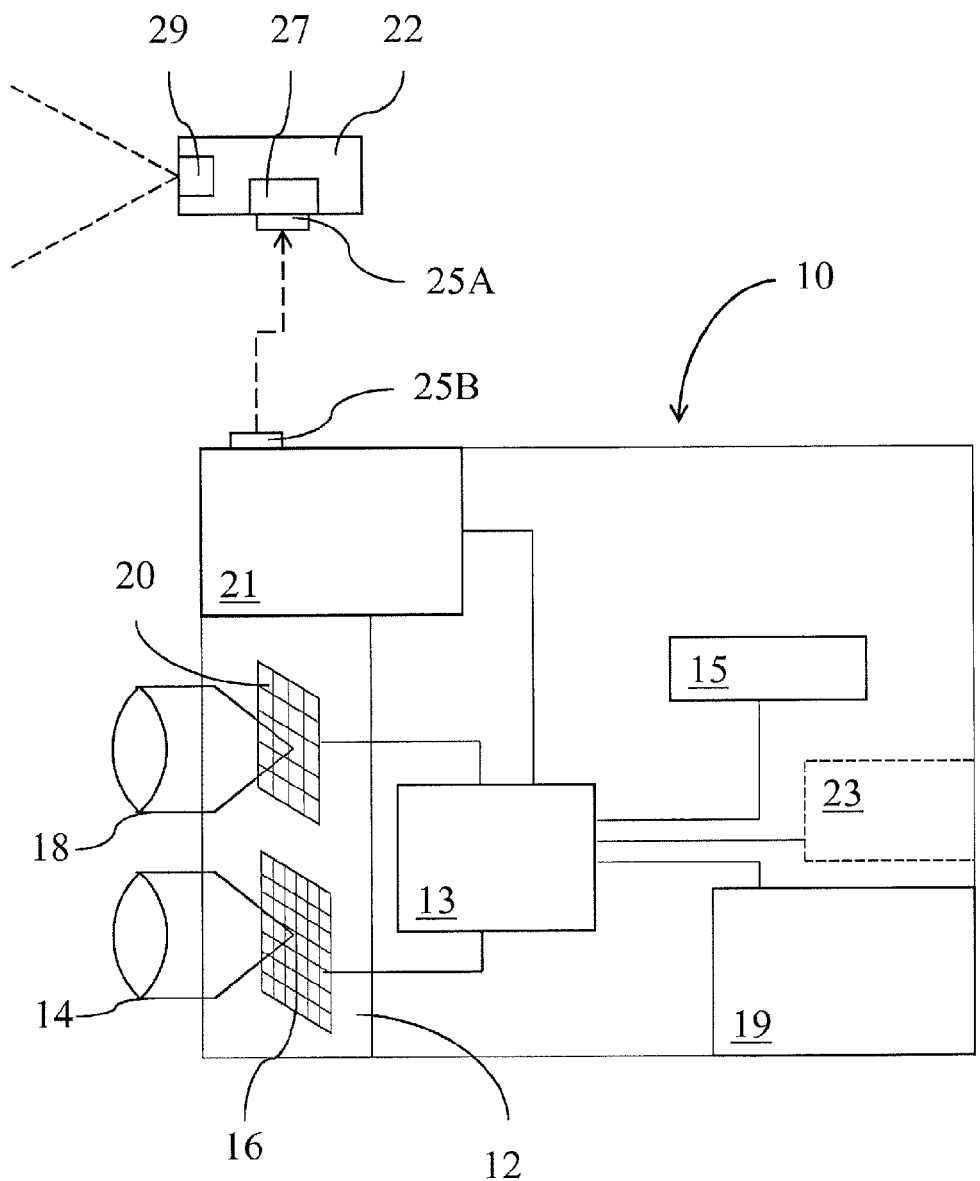
Figure 1C:
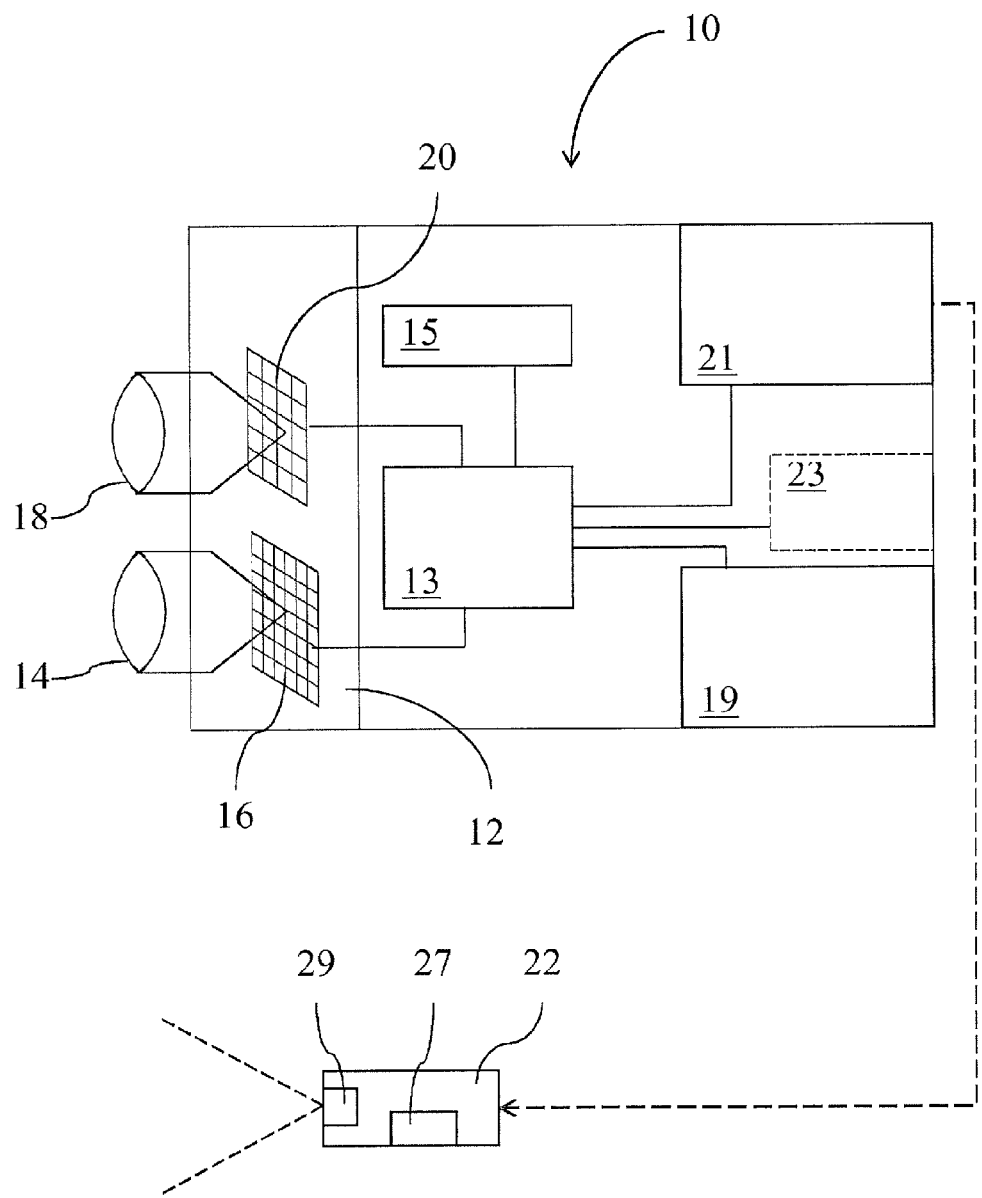

According to embodiments of the invention, there are provided methods and arrangements for presenting a combined infrared (IR) image by projecting it onto said observed real world scene, wherein the combined infrared (IR) image comprises said aligned visible representation of said detected infrared (IR) radiation information and said visible representation of additional information, wherein said visible representation of detected infrared (IR) radiation information comprised in said infrared combined (IR) image is projected in alignment with the said detected IR radiation emitted from said observed real world scene, using a thermography arrangement 10 comprising an IR imaging system 18, a visible light imaging system 14 and a visible light projecting system 22, as shown in FIGS. 1A, 1B and 1C.

According to an embodiment, the IR imaging system 18 is adapted to detect infrared (IR) radiation emitted from an observed real world scene according to a first field of view.

According to an embodiment, the processor 3 is adapted to transform infrared (IR) radiation information detected by the infrared (IR) imaging system 18 to a visible representation, thereby creating an infrared (IR) image. In this manner a visible representation of detected infrared (IR) information is created.

Align

According to one or more embodiments, the thermography arrangement comprises a visible light imaging system 14, and wherein aligning comprises using said visible light imaging system for example as follows.

According to an embodiment, the visible light projecting system 22 is adapted to project visible light pattern onto the observed real world scene according to a second field of view, at least partially overlapping the first field of view.

According to an embodiment, the visible light imaging system 14 is adapted to capture a visible light image of the observed real world scene, comprising said projected visible light, pattern according to a third field of view, the third field of view at least partially overlapping the first and/or second field of view.

According to an embodiment, the processor 13 is further adapted to detect in said captured visible light image said projected visible light pattern; determine the pixel displacement $d_{(pix\ vis)}$ in pixels in the visible light image between the projected visible light pattern pixel coordinates and pixel coordinates in the visible light image where the projected visible light would appear if the visible light imaging system and the visible light projecting system were aligned; determine the pixel displacement $d_{(pix\ IR)}$ between the IR image and the visible light image, based on the pixel displacement $d_{(pix\ vis)}$ between the projected visible light pattern and the visible light image; and align said visible light representation of said detected infrared (IR) radiation, also referred to as infrared (IR) image, to the detected infrared (IR) radiation emitted from said observed real world scene, based on said pixel displacement $d_{(pix\ IR)}$; presenting said aligned infrared (IR) image by projecting it onto said real world scene according to the second field of view, in alignment with the detected IR radiation emitted from the observed real world scene.

According to an embodiment, the processor 13 is further adapted to retrieve the distance z from the IR thermography arrangement 10 to the observed real world scene. According to further embodiments, the processor 13 is adapted to determine the pixel displacement $d_{(pix\ vis)}$ between the detected projected visible light pattern and the visible light image based on the retrieved distance z; and/or determine the pixel displacement $d_{(pix\ IR)}$ between the IR image and the visible light image, based on the pixel displacement $d_{(pix\ vis)}$ between the detected projected visible light and the visible light image and the retrieved distance z.

According to an embodiment, the visible light projecting system 22 is further adapted to present an aligned visible representation of detected infrared (IR) radiation, in other words an IR image, by projecting it onto said observed real world scene, in alignment with the detected IR radiation emitted from the observed real world scene.

According to embodiments, the visible representation of IR radiation information is presented in alignment with the IR radiation emitted from the observed real world scene.

Figure 5:
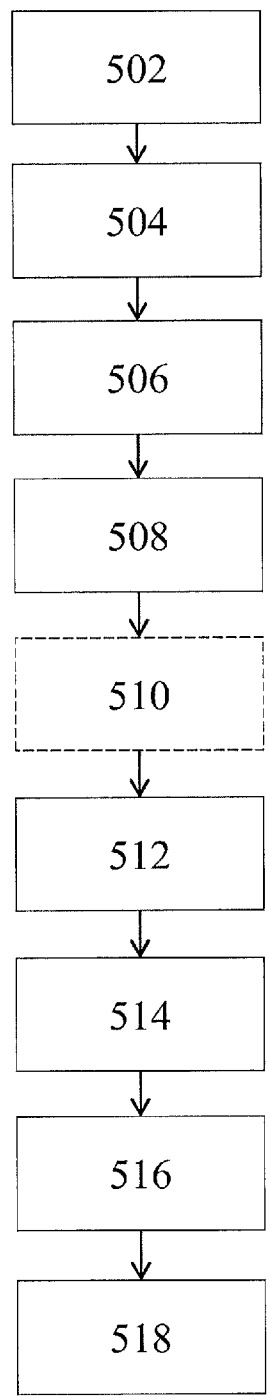
FIG. 5 is a flow chart of a method performing alignment of a projection image to detected IR radiation information according to embodiments of the invention.
Figure 6:
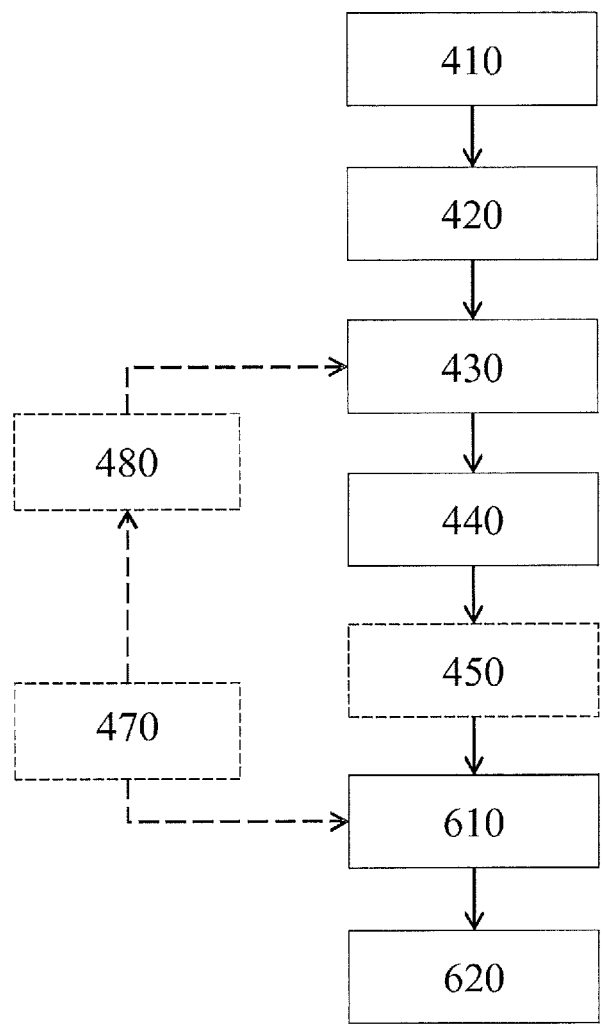
FIG. 6 is a block diagram showing adjustment during operation according to embodiments.

Embodiments of the presentation method are described further below, in connection with FIG. 5.

An arrangement adapted for this purpose comprises three optical systems, viz. an IR imaging system, a visible light imaging system and a visible light projecting system. In different embodiments, the three optical systems are either assembled into one integrated thermography arrangement or are devised with the projector as a separate component. In the case where the projector is a separate component it may be adapted to be detachably attached to an assembly or housing comprising the other optical systems or be adapted to operate physically separated from the other optical systems.

All components/units of the thermography arrangement are communicatively coupled, for example through direct connection, wired connection and/or wireless connection.

The optical systems of the thermography arrangement typically have different fields of view (FOV). In order to achieve alignment according to the present invention, the optical systems of the thermography arrangement must be placed such that the FOV of each optical system at least partly overlaps with the FOVs of the other two optical systems.

Since the optical systems of the thermography arrangement do not have the same optical axis parallax error will occur. To compensate for the parallax error, the images must be aligned.

Some of the information that is used in the calculations needed to perform alignment according to the present invention may be determined during calibration of the camera, as described in more detail below.

Integrated Device Embodiment

FIG. 1A shows a schematic view of a system according to a first embodiment of the invention wherein an integrated thermography arrangement 10 comprising three optical systems 14, 18 and 22. According to an embodiment, the optical systems 14, 18, 22 are comprised in an assembly 12. The first two optical systems are a visible light imaging system 14 which comprises a visible light sensor array 16 for the visual spectrum of light, and an IR imaging system 18 comprising an IR sensor array 20 for the infrared spectrum of light. The third optical system comprised in the assembly 12 is a visible light projecting system 22 or possibly a light projecting system adapted to project light in normally non-visible wavelength areas such as ultraviolet (UV). According to this embodiment, the three optical systems 14, 18, 22 have a fixed mounting with known relative distances and angles between the respective optical axes OA 1, OA 3, OA 2 as determined through calibration which is a kind of alignment, for instance performed during production of the thermography arrangement. The optical systems of the thermography arrangement 10 are mounted such that the FOV of each optical system at least partly overlaps with the FOVs of the other two optical systems, respectively, as illustrated in the embodiment shown in FIG. 2.

Detachably Attachable Components Embodiment

FIG. 1B shows a schematic view of a system according to a second embodiment of the invention wherein a thermography arrangement 10 comprises the three optical systems 14, 18, 22. The two imaging systems 14, 18 have a fixed mounting with known relative distances and angles between the respective optical axes OA 1, OA 3 (Cf, FIG. 2) as determined through calibration/alignment, for instance performed during production of the thermography arrangement. According to an embodiment, the visible light imaging system 14 and the IR imaging system 18 are comprised in an assembly 12. The projecting system 22 is according to this embodiment a separate component adapted to be detachably attached to the thermography arrangement 10 by means of attachment features 25A and 25B. Attachment feature 25A is provided on the projecting system 22 and is adapted to fit to a corresponding attachment feature 25B provided on the thermography arrangement 10. According to embodiments, when attached, the projecting system 22 is communicatively coupled to the processor 13 of the thermography arrangement 10 via a communication interface 21 further explained below and a corresponding communication interface 27. According to different embodiments, the communication interface 21 may be integrated in, implemented in, or coupled to any of the projecting system 22 or attachment feature 25A, while the communication interface 27 may be integrated in, implemented in, or coupled to any of the imaging systems 14 or 18, assembly 12, processor 13 or attachment feature 25B.

According to an embodiment, when the attachment features 25A, 25B are attached to each other, the visible light projection system 22 will be positioned with a certain distance and angle compared to the IR imaging system 18 and to the visible light imaging system 14, respectively. According to embodiments, the attachment features 25A, 25B may comprise a socket, a receptacle into which a tapered tool is inserted, and/or be attached to each other by a selection of the following: by means of thread, wherein one of the features 25A, 25B is screwed into the other, by fitting, snapping or clicking one of the features 25A, 25B to the other, by use of magnetism, or by use of any other suitable type of fastening or attachment mechanism. The attachment features are placed and designed such that said distances and angles between the visible light projection system 22 on the one hand and the IR imaging system 18 and the visible light imaging system 14 on the other hand will be substantially the same each time the attachment features are attached to each other, with a minor margin of error. By assuring in production of the thermography arrangement that the relative placements of the combined optical systems will be substantially the same every time the IR imaging is used, a parallax error, such as parallax distance and pointing error, between the visible light projection system 22 and the visible light imaging system 14 and IR imaging system 18, respectively, may be known from production, known from calibration/alignment during production, or approximated during use.

Figure 2:
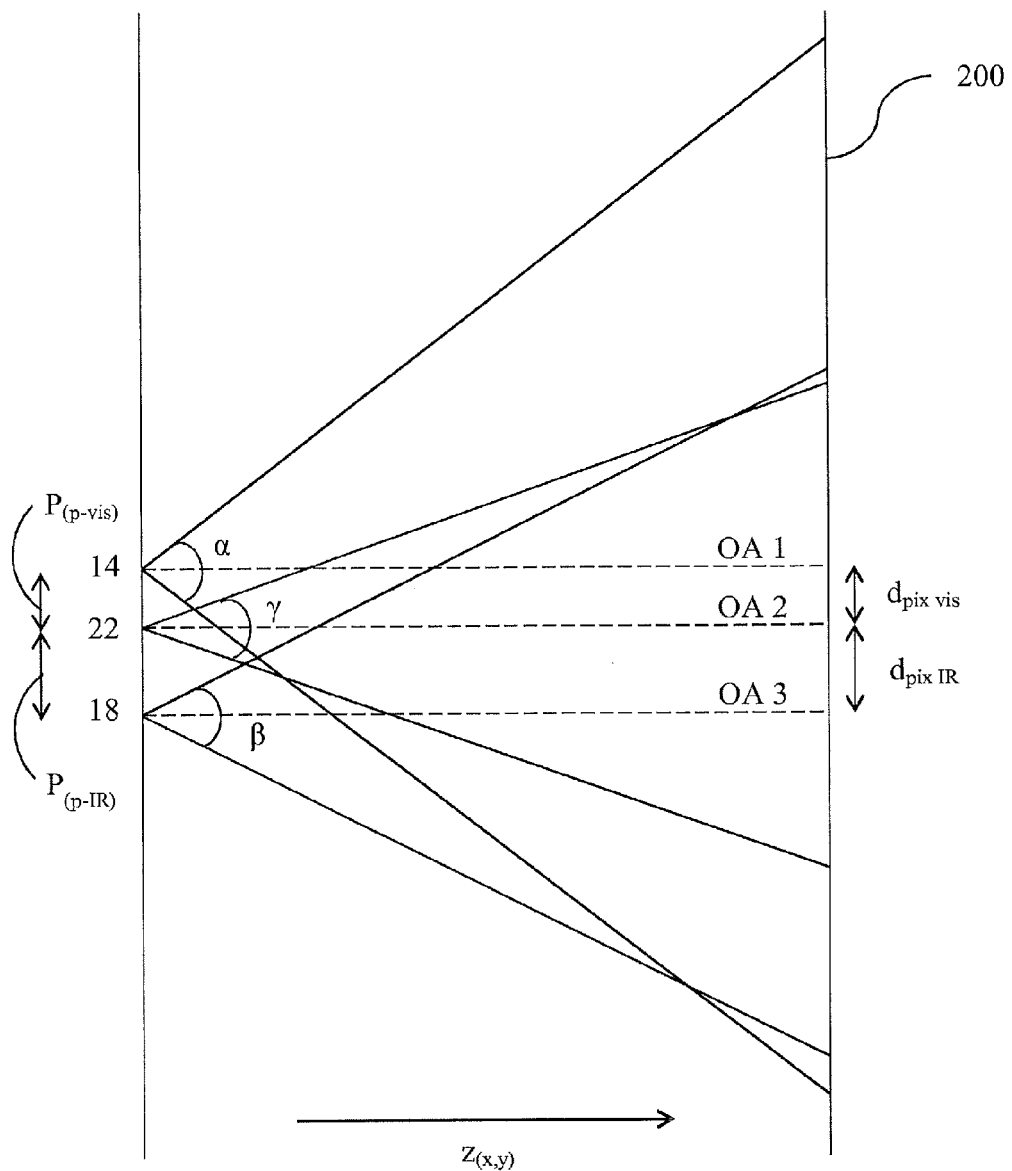
FIG. 2 shows a schematic view of an arrangement of the three optical systems of a thermography arrangement in relation to an observed real world scene in accordance with embodiments of the invention.

When the components are attached, the optical systems, here systems 14, 18, 22, of the thermography arrangement 10 are positioned such that the FOV of each optical system at least partly overlaps with the FOVs of the other two optical systems, as exemplified in FIG. 2.

Separate Components Embodiment

FIG. 1C shows a schematic view of a system according to a third embodiment of the invention wherein a thermography arrangement 10 comprises the three optical systems 14, 18, 22. The two imaging systems 14, 18 have a fixed mounting with known relative distances and angles between the respective optical axes known from production or calibration during production. According to an embodiment, the visible light imaging system 14 and the IR imaging system 18 are comprised in an assembly 12. The projecting system 22 is according to this embodiment a separate component adapted to be placed physically separated and possibly at a remote distance from the other components of the thermography arrangement 10 during operation. The projecting system 22 is communicatively coupled to the processor 13 via a communication interface 21 further explained below.

In operation according to this third embodiment, the projecting system 22 should be placed such that its FOV at least partly overlaps with the FOV of the IR imaging system and the visual light imaging system. In order to accomplish or assist in achieving at least partly overlapping FOVs the projector may be adapted to project a predetermined guide projection of visible light, e.g. in the form of an identifiable feature such as a pattern, to guide a user in placing the projecting system 22 in such a position that it projects its projection FOV onto the observed real world scene or object that the user intends to observe.

Further System Architecture Details

Referring to all the embodiments shown in FIGS. 1A-1C, the imaging systems 14, 18 comprise, according to embodiments, one or more lenses, control devices for adjusting the lenses, sensors 16, 20 adapted to capture the incoming radiation from an observed real world scene and coupled to one or more processors 13 provided with processing features adapted for processing image data received from the sensors 16, 20 as well as controlling functions of the different parts of the system. Optionally, the thermography arrangement 10 comprises a display 23 coupled to the processor 13 and being adapted to display image data. Optionally the thermography arrangement 10 comprises a graphical user interface (GUI) configured to display information to the user and to obtain user input information According to different embodiments, the thermography system 10, including or excluding the visible light projecting system 22, may be handheld, adapted to be fixedly mounted, for instance for surveillance purposes or maintenance investigations, or adapted to be mounted on a stand during use.

According to an embodiment, the thermography arrangement 10 further comprises a memory 15 for storing the data registered or processed by the thermography arrangement 10 as well as a selection of one or more control devices 19 for inputting commands and/or control signals, e.g. an interactive display, joystick and/or record/push-buttons and at least one communication interface 21, e.g. wired or wireless connections, IRDA, Bluetooth, USB, Fire-Wire, etc. In response to input commands and/or control signals, the processor(s) 13 controls functions of the different parts of the thermography arrangement 10.

According to different embodiments, the projecting system 22 may comprise a projector 29 e.g. in the form of a laser projector, a liquid crystal display (LCD) projector, a digital light processing (DLP) projector or any other suitable type of projector known in the art.

A laser projector may be suitable in many applications since a laser projector typically has a high depth of field, whereby projection of images or data onto any kind of projection surface is enabled. Typically the sharpness, color space, and contrast ratio are higher than those of other projection technologies, for example LCD or DLP projectors.

The thermography arrangement 10 may further comprise a laser pointer, not shown in the figures, per se known in the art. Such as laser pointer may applied in the present inventive concept for example be used to project visible light. According to embodiments, the visible light may be projected as an identifiable feature in the form of a limited pattern comprising all or parts of the pixels comprised in the field of view of the projecting system, herein also denoted $FOV_{proj}$.

Embodiments for parallax compensation, calibration and alignment are described below, in connection with FIGS. 2-8.

Method Embodiments for Enabling Easier Interpretation and Analysis of an Observed Real World Scene According to embodiments of the invention, methods for enabling easier interpretation and analysis of an observed real world scene are provided by presenting a visible representation of infrared (IR) radiation information onto said observed real world scene based on infrared (IR) radiation emitted from said observed real world scene, using a thermography arrangement 10 comprising an infrared (IR) imaging system 18, a visible light imaging system 14 and a visible light projecting system 22.

Figure 9:
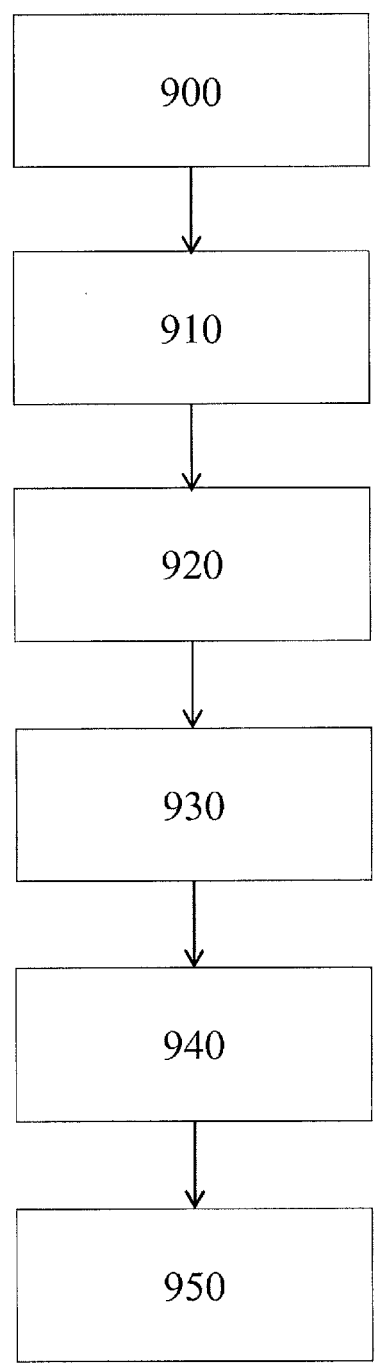
FIG. 9 is a flow chart showing method embodiments.

According to embodiments shown in FIG. 9, the method may comprise:

Step 900: Detecting infrared (IR) radiation emitted from an observed real world scene as infrared (IR) radiation information or in more specific words capturing infrared (IR) radiation information based on detected infrared (IR) radiation emitted from said observed real world scene.

According to an embodiment, the infrared (IR) radiation emitted from the observed real world scene is detected using the infrared (IR) imaging system 18, according to the field of view of the infrared (IR) imaging system 18, $FOV_{IR}$.

Step 910: Creating a visible representation of the detected infrared (IR) radiation information.

According to embodiments the visible representation of the detected infrared (IR) radiation is in the form of a detected IR image.

According to an embodiment, the processor 13 is adapted to transform detected infrared (IR) radiation information detected by the infrared (IR) imaging system 18 to a visible representation of said detecting infrared (IR) radiation information, thereby creating a visible representation of the detected infrared (IR) radiation information.

Step 920: Aligning the visible representation of the detected infrared (IR) radiation information to the detected infrared (IR) radiation emitted from the observed real world scene.

According to an embodiment, the processor 13 is adapted to align the visible representation of said detected infrared (IR) radiation to the detected infrared (IR) radiation emitted from the observed real world scene.

According to different embodiments, alignment may be achieved using any of the methods described above.

Step 930: Creating a visible representation of additional information dependent on a signal received from a predetermined source.

According to an embodiment, the processor 13 is adapted to create a visible representation of additional information dependent on a signal received from a predetermined source.

The predetermined source may comprise a selection of the following:
  user input;
  a processor;
  a memory;
  a sensor; and/or
  a measuring device.

Step 940: Creating a combined infrared (IR) image comprising the aligned visible representation of the detected infrared (IR) radiation information and the visible representation of additional information.

According to an embodiment, the processor 13 is adapted to create an infrared (IR) image comprising the aligned visible representation of the detected infrared (IR) radiation and the visible representation of additional information.

According to embodiments a distance value z from the thermography arrangement 10 to the observed real world scene is retrieved. According to embodiments projecting additional information onto the observed real world scene to scale involves projecting adapted additional information onto the observed real world scene based on a retrieved distance value z from the thermography arrangement 10 to the observed real world scene. According to embodiments a distance value z from the thermography arrangement 10 to the observed real world scene is retrieved. According to embodiments the retrieved distance value z is predetermined, retrieved from the memory 15, retrieved by calculation using relationships with known parameter and/or parameters that the thermography arrangement is enabled to retrieve, for instance the relationship of Eq. 2 presented in relation to FIGS. 2-8 or retrieved by use of a distance sensor integrated in or coupled to the thermography arrangement.

In embodiments multiple distance values z from the thermography arrangement 10 to the observed real world scene is retrieved in a manner described in relation to FIGS. 2-8.

In embodiments the length or area of a part of the additional information projected onto the observed real world scene is calculated based on the retrieved distance value z or multiple distance values z According to embodiments, creating a combined infrared (IR) image in Step 940 above further comprises ensuring that the visible representation of additional information will be projected onto said observed real world scene to scale, dependent on the retrieved distance value z or the calculated at least one distance and/or area, wherein said ensuring comprises aligning the projected light with the observed scene.

Figure 10A:
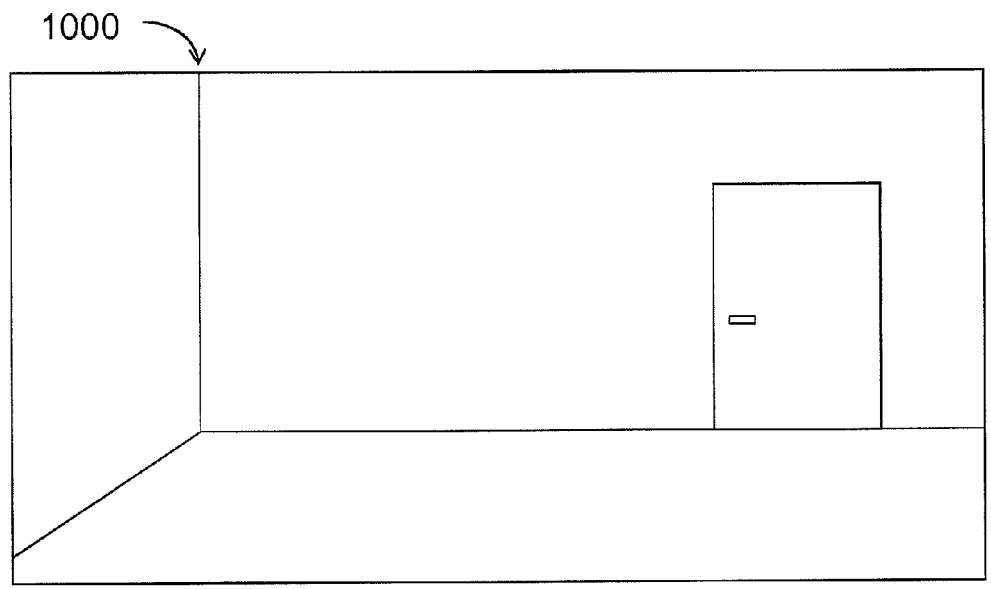
FIG. 10A shows a projection of IR information and additional information according to a first embodiment of the invention.
Figure 10B:
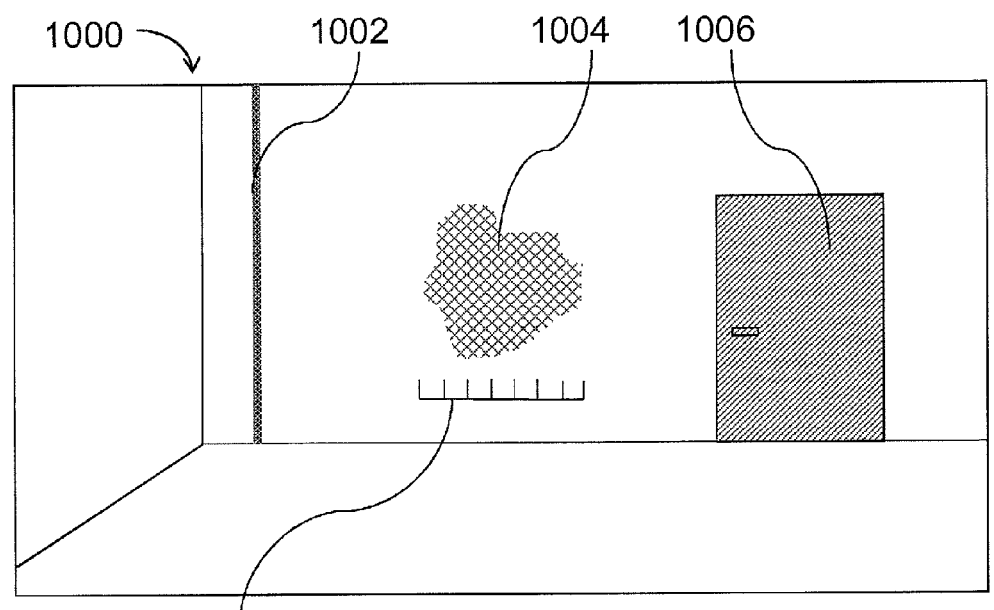
FIG. 10B shows a projection of IR information and additional information according to a second embodiment of the invention.

In FIG. 10B, the projection surface is a substantially flat wall, which is the easiest possible case for projection. However, in an observed real world scene the objects and parts of the observed real world scene onto which visible light is projected are typically at different distances from the IR imaging system 10, as shown in the embodiment of FIG. 3, meaning that the projected visual representation must be aligned with the observed real world scene, for instance according to the method embodiments presented herein in connection with FIG. 2-8.

Step 950: Presenting the combined infrared (IR) image by projecting it onto the observed real world scene, wherein the visible representation of detected infrared (IR) radiation information comprised in the infrared (IR) image is projected in alignment with the detected IR radiation emitted from the observed real world scene.

According to an embodiment, the visible light projecting system 22 is adapted to present the infrared (IR) image by projecting it onto the observed real world scene, wherein the visible representation of detected infrared (IR) radiation information comprised in the combined infrared (IR) image is projected in alignment with the detected IR radiation emitted from the observed real world scene.

Use Case Embodiments

In operation, according to an embodiment, an operator aims a handheld thermography arrangement 10 at a observed real world scene that may e.g. comprise a pipe, a wall, a floor, a ceiling or any other one or more target surfaces or objects of interest for investigation and directly sees a visible representation of emitted and detected IR radiation projected onto the observed real world scene, in alignment with the observed real world scene in such a way that the visible representation is projected in the same direction as from where the corresponding detected IR radiation was emitted. For instance, if the observed real world scene comprises a hot spot, for example an overheated electrical component, the user will see light projected onto the detected hot spot, for example in a color or light intensity that indicates that the temperature of the detected hot spot is high. According to embodiments, the light projected onto the hot spot may be red, typically used for representing a hot temperature on a color scale, or light of high intensity, if grey scale values are used for the projection. As is readily apparent to a person skilled in the art, any suitable visible representation may be used for the range of thermal, IR or temperature information detected in the observed real world scene.

According to different embodiments, further described below, the user may use the thermography arrangement to light up or highlight areas of interest in an observed real world scene or receive a warning in the form of a visible or audible alarm being projected onto the observed real world scene when an abnormality is detected.

According to another embodiment, the user may use the thermography arrangement to retrieve the distance to an observed real world scene. The distance from the thermography arrangement to the observed real world scene will hereinafter be referred to as z, wherein z is a parameter that indicates the distance from the thermography arrangement to the observed real world scene.

According to embodiments, the distance z may for instance be retrieved by calculation using relationships with known parameter and/or parameters that the thermography arrangement is enabled to retrieve, for instance the relationship of Eq. 2 presented below. According to alternative embodiments, the distance z may be retrieved by use of double visible light sensors, detection of a laser spot in an IR image, the position of the focus lens or by use of a distance sensor integrated in or coupled to the thermography arrangement in per se known manners.

In order for the thermography arrangement to work as a distance meter, it must first be calibrated. Alternative calibration embodiments are described below.

According to an embodiment, the operator may select to activate an alignment function using input features comprised in the one or more control devices 19. According to another embodiment, the alignment function is automatically activated when the thermography arrangement 10 is turned on.

According to embodiments wherein the visible light projecting system 22 is a detachably attachable component, as exemplified in FIG. 1B, and presently not attached to the handheld thermography arrangement 10, the operator attaches the visible light projecting system 22 to the handheld thermography arrangement 10 before use.

According to an alternative embodiment, wherein the visible light projecting system 22 and the handheld thermography arrangement 10 are to be used as physically separated components, the operator places the visible light projecting system 22 in a suitable position relative to the handheld thermography arrangement 10, making sure that the projecting system 22 is directed towards target surfaces or objects of interest for investigation. Possibly, the operator is guided in directing the visible light projector towards the target surfaces or objects of interest for investigation by the visible light projecting system 22 being adapted to project a predetermined guide projection of visible light, e.g. an identifiable feature in the form of a pattern or a symbol. According to embodiments, the visible light may be projected as an identifiable feature in the form of a limited pattern comprising all or parts of the pixels comprised in the field of view of the projecting system ($FOV_{proj}$). Such a projection may for instance be automatically activated when the visible light projecting system 22 is turned on, or be controlled to be activated by input from the operator. The operator may provide input using for example an input device integrated in or coupled to the visible light projecting system 22, not shown in the figure, or the control devices 19 of the thermography arrangement 10, whereby the processor 13 translates the input signal from the control device(s) 19 to a control signal that is communicated to the visible light projecting system 22 via the interface 21, in order to control the activation of the described guiding projection. The visible light projecting system 22 is communicatively coupled to the processor of the thermography arrangement by means of a wired or wireless connection, for instance communicating via communication interfaces 21 and 27.

According to an embodiment, the IR imaging system 18 of the IR imaging system 10 detects IR radiation emitted from the observed real world scene and captures said IR radiation using an IR sensor array 20 comprised in the IR imaging system 18. In the IR sensor array 20, the incoming IR radiation is turned into an IR radiation signal comprising IR radiation data. The captured IR radiation data is transmitted from the IR sensor array 20 to the processor 13, wherein the detected IR radiation data is transformed to a visible representation of image data in the form of an IR image. According to an embodiment the IR image is transferred to a display 23 of the thermography system 10 and presented to the operator of the device. However, the display of the IR image on a camera display is optional according to method embodiments of the present invention.

According to an embodiment, the visible light projecting system 22 is controlled by the processor 13 to project visible light onto the observed real world scene. According to embodiments, the visible light may be projected as an identifiable feature in the form of a limited pattern or symbol comprising all or parts of the pixels comprised in the field of view of the visible light projecting system 22, ($FOV_{proj}$). According to embodiments, the projection is performed in parallel with but not necessarily at the same time instance as the capturing and processing of IR radiation information.

According to embodiments, a pattern or symbol in the context of the present invention is a shape or distribution consisting of at least one pixel and preferably more than one pixel, typically a number of pixels, which are easily distinguishable from anything that may appear in an image of an observed real world scene. For instance, the symbol is in preferred embodiments not in the form of a single pixel or a few pixels grouped together, since a single pixel or small pixel group may be confused with noise appearing in the image. The symbol of the present invention may have the shape of an object recognizable by the human eye, such as a flower, a star or any other object known to a human. Alternatively, it may have a shape or distribution that is not interpreted as a certain object by a human, but that is easily recognizable by the human eye and/or a data processor. Similarly, a pattern in the context of the present invention also consists of more than one pixel, typically a number of pixels, which are easily distinguishable from anything that may appear in an image of an observed real world scene, as well as from noise. According to an embodiment, the symbol or pattern may have the shape of an object known to man or any other suitable shape or distribution that renders it easily recognizable by the human eye and/or a data processor. According to an embodiment, the pattern projected by the visible light projecting device 22 is simply all or selected parts of the pixels comprised in the $FOV_{proj}$. In this case, the pattern may be identified or recognized, in a visible light image comprising the pattern, based on the intensity of the projected visible light. The pixels wherein visible light is projected are likely to have a higher intensity remaining pixels of the visible light image.

According to an embodiment, during projection of the predetermined symbol or pattern, the visible light imaging system 14 is controlled by the processor 13 to capture incoming visible light using a visible light sensor array 16 comprised in the visible light imaging system 14. In the visible light sensor array 16, the incoming visible light is turned into a visible light signal comprising visible light data. The captured visible light data is transmitted from the visible light sensor array 16 to the processor 13, wherein the visible light data is transformed to a visible light image. Since the sensor elements of the visible light sensor array 16 are sensitive to the wavelength of the visible light, the reflected light of the visible light projecting system 22 may be detected in the visual image by its picture elements, i.e. pixels. The picture elements may for example be CCDs (charge-coupled devices). The captured visible light image thereby comprises a visible representation of the observed real world scene superimposed by the predetermined symbol or pattern that is being projected onto it.

According to an embodiment, after an image comprising a visible representation of the observed real world scene superimposed by the predetermined symbol or pattern is captured, the image is transmitted to the processor 13, which performs detection of the predetermined symbol or pattern in the image. Detection of the symbol or pattern in the image may be performed using any suitable detection method, per se known in the art, for example feature extraction, template matching, segmentation, edge detection, thinning, similarity measures, masking, filtering or by using a difference image.

According to an embodiment, wherein the symbol or pattern detection is to be performed using a difference image, the visible light imaging system 14 is further controlled by the processor 13 to capture an image of the same observed real world scene without the predetermined symbol or pattern projected onto it, at a time instance close to the time instance when the image comprising the observed real world scene and the predetermined symbol or pattern is captured. It does not matter which of the images is captured first and which is captured last. Preferably, the two images are two successive image frames in an image frame sequence. The reason for capturing the images in close succession to each other is that the observed real world scene normally will not have changed much from the first image frame to the second, meaning that the real world image part of the images will be substantially the same. Furthermore, in the embodiment wherein the thermography arrangement 10 is handheld, any shaking or moving of the arrangement caused by the user will be small if the images are captured in close succession, for example as two consecutive image frames in an image frame sequence. Thereby, when the processor 13 subtracts the image comprising only the representation of the observed real world scene from the image further comprising the projected symbol or pattern, a difference image comprising only the projected symbol or pattern will be obtained. In this way, any symbols or patterns present in the observed real world scene, for example patterns on a wallpaper of a wall, may not wrongfully be detected as a symbol or pattern by the thermography arrangement 10.

The visible representation of IR information, also referred to as the IR image, is transmitted from the processor 13 to the visible light projecting system 22. The visible light projecting system 22 is further controlled by the processor 13 to project the visible representation of IR information onto the observed real world scene such that the visible light representation of the detected IR radiation is aligned with the incoming, or captured, IR radiation and projected onto the observed real world scene in the same direction as from where the corresponding captured IR radiation was emitted. In order to achieve this alignment, the processor 13 uses the information on the detected symbol or pattern along with information retrieved during production, calibration in production, and/or calibration or adjustment during operation of the thermography arrangement 10. Alignment embodiments are described in further detail below.

According to embodiments of the present invention, the operator of the thermography arrangement 10 will experience that the events described above are performed instantly, in real time, meaning that the operator aims the thermography arrangement 10 at a observed real world scene comprising e.g. a surface or an object of interest and directly sees a visible representation of emitted and detected IR radiation projected onto the observed real world scene, in alignment with the observed real world scene in such a way that the visible representation is projected in the same direction as from where the corresponding detected IR radiation was emitted. The visible representation of IR information is typically colors or gray scale levels representing different thermal properties of the surfaces or objects onto which it is projected. Using the alignment method of the present invention, the visible representations projected onto the observed real world scene will be projected in the direction from which the corresponding detected IR radiation was emitted. For instance, projection of the visible representation of said detected infrared (IR) radiation in the form of an infrared (IR) image is performed such that different thermal properties of the detected infrared (IR) radiation emitted from said observed real world scene is represented. An example of this is if IR radiation representing low thermal values or temperatures is detected in a certain part of the observed real world scene, the visible light projecting system 22 will project onto this part of the observed real world scene light having a color or a gray scale value representing said low thermal or temperature value, according to e.g. the color scale or range of gray scale values selected.

In one embodiment an area in the observed real world scene where the detected infrared (IR) radiation emitted from said observed real world scene is deviating from surrounding areas can be detected, e.g. relating to an object in the observed real world scene. In one embodiment the deviation is detected by comparing the detected infrared (IR) radiation in the area to a mean value of the detected infrared (IR) radiation relating to surrounding areas, e.g., part of the detected infrared (IR) radiation in the immediate surroundings or all of the detected infrared (IR) radiation. The detection of an area with lower detected infrared (IR) radiation, e.g. in the form of thermal values or temperatures, than the mean detected infrared (IR) radiation of surrounding areas is sometimes referred to as detection of a "cold spot", which may indicate that the area for instance is poorly insulated, or is exposed to water leakage or formation of condensation and thereby has an increased risk of being water damaged. The detection of an area with higher detected infrared (IR) radiation, e.g. in the form of thermal values or temperatures, than the mean detected infrared (IR) radiation of surrounding areas is sometimes referred to as detection of a "hot spot", which may indicate for instance that the area comprises overheated components and has an increased risk of catching fire. If a color scale representing detected infrared (IR) radiation of the observed real world scene ranging from blue for low temperatures to red for high temperatures is used, a cold spot in the observed real world scene would typically have blue colored light projected onto it, while a hot spot in the observed real world scene would have red colored light projected onto it by the visible light projecting system 22. The operator is thereby enabled to see the hot and cold spots directly in the observed real world scene that he or she is investigating, in alignment with the observed real world scene, even if the cause of the low or high thermal or temperature values is on the other side of a surface at which the operator is aiming the IR imaging system 10.

The red and blue areas described above are by means of example only. Any color scale, gray scale, or other suitable visible representation may be used by the visible light projecting system 22 to represent the different IR radiation levels detected. For instance, different IR radiation levels may be represented by different patterns or light intensities.

The visible light projecting system 22 may project visible light according to the selected visible representation of detected IR radiation levels onto the parts of the observed real world scene that are within its entire FOV if the FOV of the visible light projecting system 22 is completely comprised in the FOV or the IR imaging system 18. Alternatively, if the FOV of the visible light projecting system 22 only partly overlaps with the FOV or the IR imaging system 18, the visible light projector may project visible light onto the parts of the observed real world scene that lie within the overlapping part of the FOVs of the two systems. Alternatively, the visible light projecting system 22 projects visible light only onto parts of the observed real world scene from which IR radiation above, below or between certain selected temperature values or intervals has been detected and that lies within the overlapping part of the FOVs of the two systems. Other selections of which parts of the overlapping FOVs the visible light projecting system 22 should project light onto could also be considered. For example, visible light may be projected onto areas of interest indicated by the operator, using input features of the IR imaging system 10, or onto objects detected in the image by object detection features implemented in the processor 13. According to an embodiment, illustrated in FIG. 2, the visible light imaging system 14 has the largest FOV, the IR imaging system 18 has the second largest FOV and the projecting system 22 has the smallest FOV. However, any other relationship in FOV sizes is conceivable, depending on circumstances such as price, performance and end customer requirements.

Since the projected visible light is aligned with the detected IR radiation emitted from the observed real world scene and projected in the direction from which the detected IR radiation was emitted, no visible light will be projected onto parts of the observed real world scene that does not fall within the FOVs of both the IR imaging system 18 and the visible light projecting system 22.

Examples of projection embodiments are shown in FIGS. 10A and 10B.

FIG. 10A shows an observed real world scene 1000 that comprises a room with a floor, walls and a door.

FIG. 10B shows the same observed real world scene 1000, wherein a visual representation as a combined infrared (IR) image, wherein the infrared (IR) image comprises an aligned visible representation of said detected infrared (IR) radiation information and a visible representation of additional information, is presented by projecting it onto said observed real world scene, wherein said visible representation of detected infrared (IR) radiation information comprised in said infrared combined (IR) image is projected in alignment with the said detected IR radiation emitted from said observed real world scene, for example in the form of different colors or light intensities representing different measured levels of IR radiation. For instance, an intensity scale or a color scale wherein different temperature intervals are represented by different intensity levels or colors may be used, as is well known in the art.

According to the embodiments of FIGS. 10A and 10B, the visible light is presented onto the observed real world scene 1000 by means of a visible light projecting system, such as for instance a liquid crystal display (LCD), a digital light processing (DLP) projector or a laser projector. In FIG. 10B, a visible light projection is illustrated as different half-tone levels representing different detected temperature values or temperature intervals in the observed real world scene. Of course, all parts of the observed real world scene 1000 will emit IR radiation that is detectable by the IR sensor 20 of the system described above. According to the embodiment in FIG. 10B, the projector only projects visible representation onto parts of the observed real world scene, for instance according to user selections of areas of interest, or preset or user selected IR radiation information values or intervals of interest. In the embodiment illustrated in FIG. 10B, a pipe 1002, an area 1004 on the back wall and the door 1006 are the targets of projected visible light. As stated above, the different halftone patterns of the target areas 1002, 1004, 1006 may instead be different colors or light intensities, representing different IR radiation levels or intervals. For instance, the halftone pattern (color, light intensity) of the pipe 1002 may indicate an IR radiation level or interval corresponding to a high temperature value or interval, indicating to the user that this area is a "hot spot". The halftone pattern (color, light intensity) of the area 1004 may in turn correspond to a low temperature, indicating to the user that this is a "cold spot", and the halftone pattern (color, light intensity) of the door 1006 may relate to a third temperature value or interval, possibly between the temperature values or intervals of 1002 and 1004.

According to embodiments the combined infrared (IR) image is projected onto said observed real world scene, wherein said visible representation of detected infrared (IR) radiation information comprised in the infrared combined (IR) image is projected in alignment with said detected IR radiation emitted from said observed real world scene and the visible representation of additional information projected to scale.

According to embodiments projecting additional information onto the observed real world scene to scale involves projecting aligned additional information onto the observed real world scene based on a retrieved distance value z.

In one non-limiting example a straight line would be aligned so that when it is projected onto the observed real world scene it would appear to the user as a straight line even though the surface of objects in the observed real world scene are at varying distances from the thermography arrangement and the object surfaces are not orthogonal to the projection direction.

In one non-limiting example grid lines would be adapted so that when it is projected onto the observed real world scene it would appear to the user as to have equivalent distance between the gridlines even though the surface of objects in the observed real world scene are at varying distances from the thermography arrangement and the object surfaces are not orthogonal to the projection direction.

In one embodiment the additional information is aligned based on a distance map, wherein each value in the distance map corresponds to retrieved distance values from the thermography arrangement 10 to points in the observed real world scene. The adaption of the visual representation to the surface of objects in the observed real world scene can be made according to any method known in the art.

According to embodiments, additional information 1008 may further be projected. In FIG. 10B, additional information 1008 is exemplified as relative length unit or length measurement information enabling projection to scale of the length measurement information onto the observed scene, in the form of a ruler, projected to scale onto the observed real world scene, thereby aiding a user in interpreting the size or distribution of for example objects in the observed real world scene and/or areas of projected visible light. Additional information according to different embodiments is presented below.

According to an embodiment, the additional information comprises a guiding help grid, or grid lines. According to an embodiment, the guiding help grid or grid lines provides length/area measurement information projected onto the observed real world scene to scale, thereby aiding the user in interpreting the sizes/areas/distances of different parts of or objects present in the observed real world scene. According to another embodiment, the grid or grid lines provide relative length/area information, helping a user relate sizes/areas/distances of different parts of or objects present in the observed real world scene to each other.

According to an embodiment, the additional information comprises orientation information enabling a user of interpreting the orientation of parts of the observed scene, helping a user to relate the orientation of different parts of or objects present in the scene to each other. In one non limiting example the orientation information is indicating horizontal and/or vertical orientation, for example obtained from a gyroscope integrated in or coupled to the thermography arrangement. In one non-limiting example the orientation information is in the form of a line level, spirit level, or bubble level or any other indicators used in the art to indicate whether the orientation of objects in the observed real world scene is horizontal (level) or vertical.

According to embodiments projecting additional information onto the observed real world scene to scale comprises projecting text information as additional information. In one non-limiting example the text information is temperature values obtained from a sensor, humidity values obtained from a sensor or levels obtained from the detected IR radiation information, in manners known in the art. The text information may be comprised in the IR image projected onto the observed scene as numeric values or intervals or as any other suitable visible representation that will aid a user in interpreting or analyzing the observed scene.

According to an embodiment, the additional information may comprise temperature related information, such as temperature values or levels or humidity values or levels obtained from the captured IR radiation information, in manner known in the art. The temperature related information may be comprised in the IR image projected onto the observed scene as numeric values or intervals or as any other suitable visible representation that will aid a user in interpreting or analyzing the observed scene.

According to embodiments projecting additional information onto the observed real world scene to scale involves projecting graphical information as additional information. In one non-limiting example the graphical information comprises a sketch, a drawing, or any graphical information related to the observed real world scene.

According to an embodiment, the additional information comprises writing/text, a sketch and/or a drawing. In one non-limiting example the additional information is input by a user using one or more of the control devices 19. According to an embodiment, the additional information is input through touch functionality.

According to embodiments wherein at least one distance z from the thermography arrangement 10 to the observed real world scene is known or retrieved, length and/or area of a part of the observed real world scene may be calculated, in manners known in the art.

According to embodiments, creating a combined infrared (IR) image in Step 940 above further comprises ensuring that the visible representation of additional information will be projected onto said observed real world scene to scale, dependent on the retrieved distance z or the calculated at least one distance and/or area.

In FIG. 10B, the projection surface is a substantially flat wall, which is the easiest possible case for projection. However, in a observed real world scene the objects and parts of the observed real world scene onto which visible light is projected are typically at different distances from the IR imaging system 10, as shown in the embodiment of FIG. 3, meaning that the projected light must be aligned with the observed real world scene, for instance according to the method embodiments presented herein in connection with FIGS. 2-8.

According to embodiments, different aspects of the invention described herein may be used to investigate observed real world scenes and identify relevant information.

Relevant information may for example be hot or cold spots or areas in an investigated observed real world scene, indicating energy thieves, or power thieves, caused by for example poor insulation, or malfunctioning or overheated electrical components.

According to an embodiment, different aspects of the invention, as presented above, may be used to enhance or highlight for example detected moisture over/under/in between certain predefined levels, wherein the moisture level may be calculated from measured IR or temperature information in manners known per se.

According to another embodiment, different aspects of the invention, as presented above, may be used to inform the user of the location of heating in floor, electrical wiring, water pipes or the like, which may for example be advantageous for a user in the construction or electrical business. When such relevant information is projected onto an observed real world scene, a user may, aided by the projection, draw, mark, write or sketch onto the observed real world scene information that relates to the projected information or conclusions drawn by the user, thereby enabling easier analysis even after the projection is turned off.

According to embodiments, additional information may comprise graphical elements presented in a graphical user interface (GUI) on a display of the thermography arrangement, wherein said graphical elements represent a selection of the following:
  measurement values presented as temperature, humidity, emissivity, or effect. Effect may here be expressed as W/m$^2$ or as W, if one or more distances z has been retrieved and area related information has been calculated based on the one or more distances;
  one or more point and/or area markers for selecting one or more points and/or areas of interest;
  one or more input fields for user input; and
  one or more selectable menu items.

According to an embodiment, the user is enabled to control what is being presented, or the appearance of what is being presented, in the GUI on the display of said thermography arrangement. For example, the user may be enabled to control the GUI by interaction with the thermography arrangement 10, using one or more of the control devices 19. According to embodiments, the user interacting with one or more of the control devices 19 generates input and/or control signals adapted to be interpreted by the processor 13, or another processing device integrated in or coupled to the thermography arrangement. Upon receiving such an input or control signal, the processing unit is adapted to change the appearance of the GUI shown on the display of the thermography arrangement 10 and/or what is being projected as additional information onto the observed real world scene. Whether parts or all of the information comprised in the GUI shown on the display of the thermography arrangement is also going to be projected onto the observed real world scene may either be preset or selected by the user, for example through interaction with one or more of the control devices 19.

Presentation/Projection Modes

According to an embodiment, there are provided more than one projection mode. According to embodiments, a user is enabled to select between different projection modes, for example using one or more of the control devices 19.

According to embodiments, possible projection modes comprise a selection of the following:
  Projecting a visible light representation of the entire observed real world scene, limited by the $FOV_{Proj}$ of the visible light projecting system 22. According to this embodiment, the visible light projection may be a visible representation of the IR radiation captured using the IR imaging system 18, comprising the parts of the observed real world scene that are comprised within both $FOV_{IR}$ or the IR imaging device 18 and $FOV_{proj}$.
  Projecting a visible light representation of one or more objects comprised in the observed real world scene. According to these embodiments, one or more objects may be selected by the user, using one or more of the control devices 19. Alternatively, the processor 13 may be adapted to automatically identify objects, for example based on temperature or moisture patterns or thresholds. Identification, automatic or based on user selection, may be performed by object recognition functionality comprised in the processor 13, using any suitable object recognition method, known per se.
  Projecting a visible light representation of selected parts of one or more objects comprised in the observed real world scene.
  Projecting visible light marker onto the observed real world scene;
  project visible light marker on hot spots or objects; or
  project visible light marker on cold spots or objects.

According to an embodiments, the brightness levels and/or color values of the visible light projected may be adjusted, based on the brightness levels and/or color values of the parts of the observed real world scene onto which the visible light is projected. The brightness levels and/or color values of the projected visible light are typically adjusted such that the projected visible light can be distinguished as clearly as possible by the human eye from the parts of the observed real world scene onto which it is projected. For example, if the observed real world scene is black, visible light of high brightness may be projected, if the relevant part of the observed real world scene is green, a different color, typically a contrasting color may be projected, so that the projection is clearly visible in the observed real world scene.

According to different embodiments, adjustments of the projected visible light may be done by controlling the visible light projecting system 22 to project light of certain brightness levels and/or colors during operation, or by adjusting the brightness levels and/or colors of the IR image before sending it to the projector. According to embodiments, brightness levels and/or colors may be preset, calculated based on the colors of the observed real world scene onto which the visible light is to be projected or selectable by a user, for example using one or more of the control devices 19.

According to an embodiment, the processor 13 may be adapted to detect the brightness levels and/or color values in a visible light image (captured by the visible light imaging system) of the observed real world scene; calculate brightness levels and/or color levels based on the detected brightness levels and/or color levels.

According to alternative embodiments, the processor 13 may be adapted to adjust the brightness levels and/or color levels of the IR image before it is transferred to the visible light projecting system 22, or to control the visible light projecting system 22 to adjust the brightness levels and/or color levels of the projected visible light, based on the preset, calculated or user selected brightness levels and/or color levels.

Field of View (FOV) and Parallax

FIG. 2 illustrates the field of view (FOV) of the visible light imaging system 14, of the thermography arrangement 10 of FIG. 1, represented as an angle α, the FOV of the infrared imaging system 18 represented as an angle β, and the FOV of the visible light projecting system 22 represented as an angle γ. The optical axes of the three optical systems 14, 18 and 22 are shown as dashed lines OA 1, OA 3 and OA 2, respectively.

Two factors contribute to the relative displacement of images and/or projections produced by different imaging systems. First, the respective distances between the imaging systems 14, 18, 22 causes a displacement, also referred to as parallax distance, of the images that is constant in meters but decreases in number of pixels, e.g. $d_{(pix\ vis)}$, with increasing distance to the object. Second, the optical axes OA 1, OA 3, OA 2 of the different imaging systems 14, 18, 22 are normally not perfectly parallel. The respective angle between them causes a displacement, also referred to as a pointing error or directional error, which varies in meters with the distance to the object but is constant in number of pixels. A pointing error, or directional error, is caused by the difference in angle between the optical axes of two of the optical system compared to the desired angle, and occurs due to construction inaccuracies. For instance, when the visible light imaging system 14 and the IR imaging system 18 are assembled in production, they will not be assembled in exactly the same way for every thermography arrangement 10. Slight differences will occur, and thereby also directional errors.

According to an embodiment, the term parallax as used in the present text includes the combined pixel displacement caused by the distance between the imaging subsystems and the angle between the optical axes.

As can be seen in FIG. 2, there is a parallax distance $P_{(p\text{-}vis)}$ between the optical axis OA 2 of the projecting system 22 and the optical axis OA 1 of the visible light imaging system 14, and another parallax distance $P_{(p\text{-}IR)}$ between the optical axis OA 2 of the projecting system 22 and the optical axis OA 3 of the IR imaging system 18.

The parallax distance $P_{(p\text{-}vis)}$ causes a pixel displacement between a visual image projected by the visible light projecting system 22 and an image captured by the visible light imaging system 14. This pixel displacement is hereinafter denoted $d_{(pix\ vis)}$.

The parallax distance $P_{(p\text{-}IR)}$ causes a pixel displacement between a visual image projected by the visible light projecting system 22 and an IR image captured by the IR imaging system 18. This pixel displacement is hereinafter denoted $d_{(pix\ IR)}$.

As is readily apparent to a person skilled in the art there is further a parallax distance $P_{(vis\text{-}IR)}$ between the optical axis OA 1 of the visible light imaging system 14 and OA 3 of the IR imaging system 18, causing a pixel displacement between an image captured by the visible light imaging system 14 and an IR image captured by the IR imaging system 18. According to all embodiments of the present invention, the visible light imaging system 14 and the IR imaging system 18 are integrated in the assembly 12, whereby the parallax distance $P_{(vis\text{-}IR)}$ is known from production and may be compensated for during calibration or operation of the thermography arrangement 10.

The pixel displacements $d_{(pix\ vis)}$ and $d_{(pix\ IR)}$, shown in FIG. 2, may be determined empirically as a function of the distance $z_{(x,y)}$ that represents the distance from the thermography arrangement 10 to each of a selection of points on the observed real world object, objects or observed real world scene, for example during production or calibration of the thermography arrangement 10. According to an embodiment, the distance z may be described as the distance to the part of the observed real world scene representing a specific coordinate in the captured visual image in which the projected pattern is detected, in combination with the parallax distance $P_{(p\text{-}vis)}$ between the visible light projecting system 22 and the visible light imaging system 14.

In one embodiment the determination of the pixel displacements as a function of the distance z from the thermography arrangement to the observed real world scene may hence be performed for the visible light imaging system 14 and the IR imaging system 18, respectively, using methods known per se.

According to an embodiment, the determined pixel displacements as a function of the distance z are stored in a memory in the thermography arrangement 10, for example, the memory storage 15, and can be used to compensate for parallax errors during operation.

According to embodiments, the distance z is determined relative to a predetermined coordinate in the image representing the observed real world scene, such as the center of the image, a corner of the image or any other suitable coordinate in the image.

The respective parallax distances $P_{(p\text{-}vis)}$, $P_{(p\text{-}IR)}$ and pointing errors, or directional errors, between the optical systems of the thermography arrangement 10 may be used to estimate equations or curves for the displacement as a function of the distance to the object. This equation or curve may be stored in a memory in the thermography arrangement 10, for example the memory storage 15, and can be used to compensate for parallax errors during operation through mapping of a determined distance to the relevant parallax distance equation or curve.

As previously mentioned, the projected predetermined visible light symbol or pattern usually consists of more than one pixel, typically a number of pixels. Thereby, the symbol or pattern is more reliably determined than if only one pixel/one point was used for determining the distance. Furthermore, since the symbol or pattern has a shape or distribution that is easily distinguishable from anything that may appear in an image of an observed real world scene and may have the shape of an object known to man or any other suitable shape or distribution that renders it easily recognizable by a data processor, whereas a single pixel may be confused with other objects or noise present in the image.

Alignment

As explained above, the parallax distance expressed in length units e.g. in meters $P_{(p\text{-}vis)}$ causes the pixel displacement $d_{(pix\ vis)}$ between a visual image projected by the visible light projecting system 22 and an image captured by the visible light imaging system 14 and the parallax distance $P_{(p\text{-}IR)}$ causes the pixel displacement $d_{(pix\ IR)}$ between a visual image projected by the visible light projecting system 22 and an IR image captured by the IR imaging system 18. As is readily apparent to a person skilled in the art, there is typically also a parallax distance between the visible light imaging system 14 and the IR imaging system 18, causing a third pixel displacement between images captured by the different optical systems. This parallax distance and pixel displacement are not shown in FIG. 2.

According to an embodiment, the processor 13 is arranged to perform alignment of images captured by and/or light projected by any or all of the optical systems 14, 18, 22.

In order to be able to align the visible light projected onto the observed real world scene, using the visible light projecting system 22, with the IR radiation emitted from the observed real world scene, detected and transformed into an IR image by the IR imaging system 18, the displacement between the projected visible light and the detected IR radiation must be calculated, or approximated, and compensated for. According to different embodiments presented below, calculation or approximation of this displacement is performed either in calibration during production, self-calibration or self-adjustment during operation of a thermography arrangement 10.

Calibration During Production

According to the embodiment illustrated in FIG. 1A, the visible light imaging system 14, the IR imaging system 18 and the visible light projecting system 22 are all assembled in an integrated thermography arrangement 10, for example integrated in an assembly 12, with known parallax distances between the different optical devices 14, 18, 22, and optical axes OA 1, OA 3, OA 2, respectively.

According to this embodiment, the thermography arrangement may be calibrated in production or manufacturing of the thermography arrangement 10. During such a calibration, all parallax distances are known since the distances between the optical axes OA 1, OA 3, OA 2 are known. Other parameters that are known when calibration is performed during production are: the field of view of the visible light imaging system 14 ($FOV_{vis}$); the field of view of the IR imaging system 18 ($FOV_{IR}$); distance z to the observed real world scene; and the translation, or mapping function, $f(z)$ between image coordinates of an image captured using the visible light imaging system 14 and an image captured using the IR imaging system 18, as a function of z.

According to embodiments, the distance z is determined relative to a predetermined coordinate in the image, such as the center of the image, a corner of the image or any other suitable coordinate in the image.

Figure 4A:
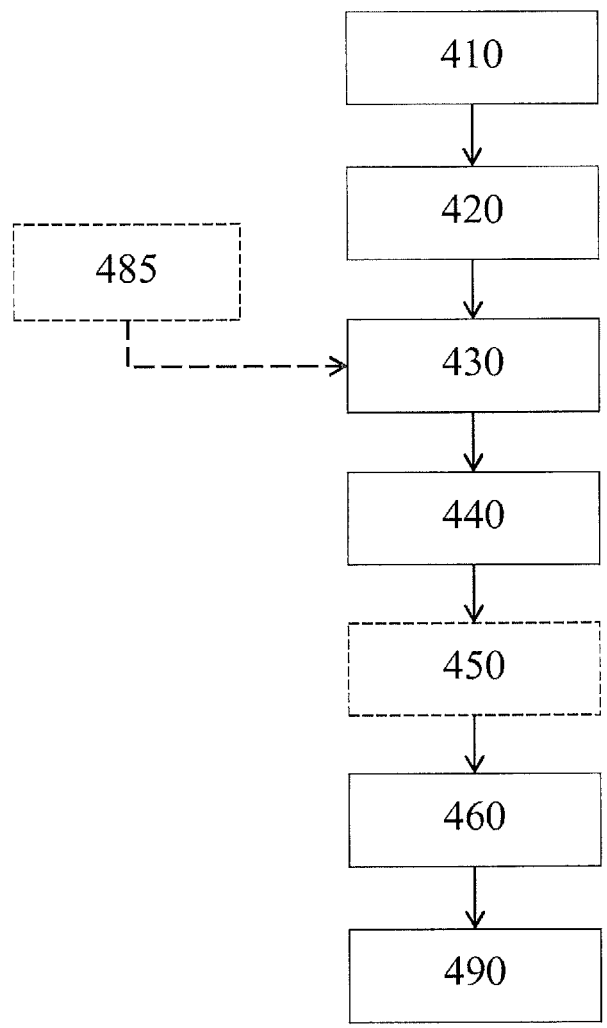
FIG. 4A is a block diagram showing calibration during production according to embodiments.

Embodiments of production calibration methods comprise the following steps, illustrated in FIG. 4A:

Step 410: Project visible light onto the observed real world scene using the projecting system 22, according to a second field of view at least partially overlapping the first field of view of the IR imaging system.

According to embodiments, the visible light projected may be in the form of an identifiable feature such as a pattern or symbol.

Step 420: Capture a visible light image of the observed real world scene, comprising the projected visible light pattern, using the visible light imaging system 14, according to a third field of view, the third field of view at least partially overlapping the first and/or second field of view.

According to an embodiment, two visible light images are captured, wherein one comprises the observed real world scene and the projected visible light while the other comprises the observed real world scene without the projected visible light. In other words, the projecting device projects visible light onto the observed real world scene during the time when one of the images is captured, but not while the other image is captured. By subtracting the captured images, a difference image comprising the projected visible light, but not the observed real world scene, is obtained.

Step 430: Detect the projected visible light pattern in the visible light image, or in the difference image if such an image has been obtained in Step 420.

According to an embodiment, there is a known predetermined relationship between the distance z to the observed real world scene and the location in a captured visible light image wherein a projected visible light will appear. Therefore, the distance z may in an optional Step 485 be used as input to the detection of the projected visible light. Thereby, a more efficient detection is obtained as the detection starts in the most probable location, or coordinates, of the visible light image.

Step 440: Calculate the pixel displacement $d_{(pix\ vis)}$ between the light projected by visible light projecting system 22 and the image captured by the visible light imaging system 14, based on the captured visible light image. In other words, determine the displacement in pixels, $d_{(pix\ vis)}$ in the visible light image, between the projected visible light pattern pixel coordinates and pixel coordinates in the visible light image where the projected visible light would appear if the visible light imaging system 14 and the visible light projecting system 22 were aligned, for instance known from production or calibration. An example of a pixel displacement $d_{(pix\ vis)}$, is shown in FIG. 2.

As is readily apparent to a person skilled in the art, the pixel displacement may for example be expressed as divided into an x direction component and a y direction component ($dx_{(pix\ vis)}$, $dy_{(pix\ vis)}$) or expressed as polar coordinates, depending on circumstances.

Step 450: Calculate the FOV of the projector, $FOV_{proj}$, if it not already known.

Since the FOV of the visible light imaging system, $FOV_{vis}$, is known, $FOV_{proj}$ may be calculated based on the captured visible light image, or difference image, comprising the projected visible light, that may be represented as an area, an identifiable feature, a pattern or a symbol, in the following way:

According to an embodiment, it is known what percentage of the $FOV_{proj}$ that is represented by the distance between two or more predetermined points in the projected area, feature, pattern or symbol, for example in the x or y direction. In the captured visible light image, comprising the projected visible light area, feature, pattern or symbol, the pixel distance between predetermined points of the projected visible light area, feature, pattern or symbol is determined. Since the resolution, in pixels, of the visible light image is known, the percentage of the visible light image, and thereby the percentage of $FOV_{vis}$ that is represented by the distance between the two point of the projected visible light area, feature, pattern or symbol may be determined based on said pixel distance. Knowing $FOV_{vis}$ and further knowing the relationship between the percentage of the $FOV_{vis}$ and the $FOV_{proj}$, respectively, that represents the distance between the predetermined points of the projected visible light area, feature, pattern or symbol, $FOV_{proj}$ may be determined.

Step 460: Determine calibration parameters in the form of the calibration parameters $c_0$ and $c_1$.

The calibration parameter $c_0$ is a theoretical constant relating to the parallax distance between the optical axes of the two optical systems compared, for example the optical axes OA1, OA2. According to an embodiment, $c_0$ is expressed in (length unit×number of pixels).

The calibration parameter $c_1$ relates to the pointing, or directional, error. In other words, $c_1$ relates to the angle between the optical axes of the two optical systems compared, for example the optical axes OA1, OA2. According to an embodiment, c1 is expressed in pixels.

According to an embodiment, the calibration parameters are determined in the following way:

$$\begin{cases} c_0 = f(FOV_{vis}, P_{(p\text{-}vis)}) \\ c_1 = d_{(pixvis)} - \dfrac{c_0}{z} \end{cases} \quad \text{(Eq. 1)}$$

wherein the distance z to the observed real world scene, expressed in length units, is known and $d_{(pix\ vis)}$ is the pixel displacement, expressed in pixels, as calculated in Step 440.

As is readily apparent to a person skilled in the art, the calibration parameters may for example be expressed as divided into an x direction component and a y direction component ($c_{0x}$, $c_{0y}$), ($c_{0x}$, $c_{0y}$) or expressed as polar coordinates, depending on circumstances.

Step 490: Calibrate the optical systems of the thermography arrangements, or in other words compensate for parallax error, or pixel displacement and pointing error, determined in step 460.

After the calibration in Step 490, a projection produced by the projecting system 22 will be aligned with the IR radiation captured by the IR imaging system 18. In other words, after Step 490, the thermography arrangement is ready to operate, and may further, according to embodiments, be used as a distance sensor during operation.

According to an embodiment, the calibration process described above is performed more than once, for example two or three times, in order to ensure proper calibration.

Figure 8:
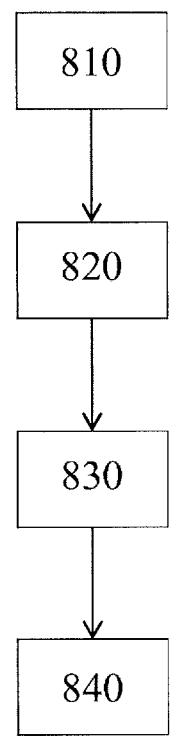
FIG. 8 is a block diagram showing operation of a calibrated thermography arrangement according to embodiments.

Embodiments of the operation of a calibrated or aligned thermography arrangement are illustrated in FIG. 8.

Self-Calibration

According to another embodiment, the thermography arrangement is adapted for self-calibration and the parallax distances between the visible light projecting system 22 on the one hand and visible light imaging system 14 and IR imaging system 18, respectively, on the other hand may be approximated.

According to this embodiment, shown in FIG. 1B and further described in the section Detachably attachable components embodiment, an attachment feature 25A is provided on the projecting system 22 and is adapted to fit to a corresponding attachment feature 25B provided on the IR imaging system 10 so that the projecting system 22 can be attached to and detached from the IR imaging system 10. Such an attachment feature can for example be formed as an attachment coupling with a first coupling part 25A fixed to the projecting system and a second coupling part 25B fixed to the IR imaging system. When attached, the visible light projecting system 22 is according to an embodiment positioned with a certain parallax distance and pointing error compared to the IR imaging system 18 and the visible light imaging system 14 respectively, substantially the same each time the attachment features are attached to each other, with a minor margin of error.

According to an embodiment, the thermography arrangement is self-calibrating. During such a self-calibration, the following parameters are known from calibration in production of the thermography arrangement: the parallax distance and pointing error between the visible light imaging system 14 and the IR imaging system 18; the field of view of the visible light imaging system 14 ($FOV_{vis}$); the field of view of the IR imaging system 18 ($FOV_{IR}$); and the translation, or mapping function, $f(z)$ between image coordinates of an image captured using the visible light imaging system 14 and an image captured using the IR imaging system 18, as a function of the distance z to the observed real world scene. According to embodiments, the aim of the self-calibration is to estimate the parallax distance calibration parameter, the pointing error and, if it is not already known, the field of view of the projecting system 22 ($FOV_{proj}$)

Figure 4B:
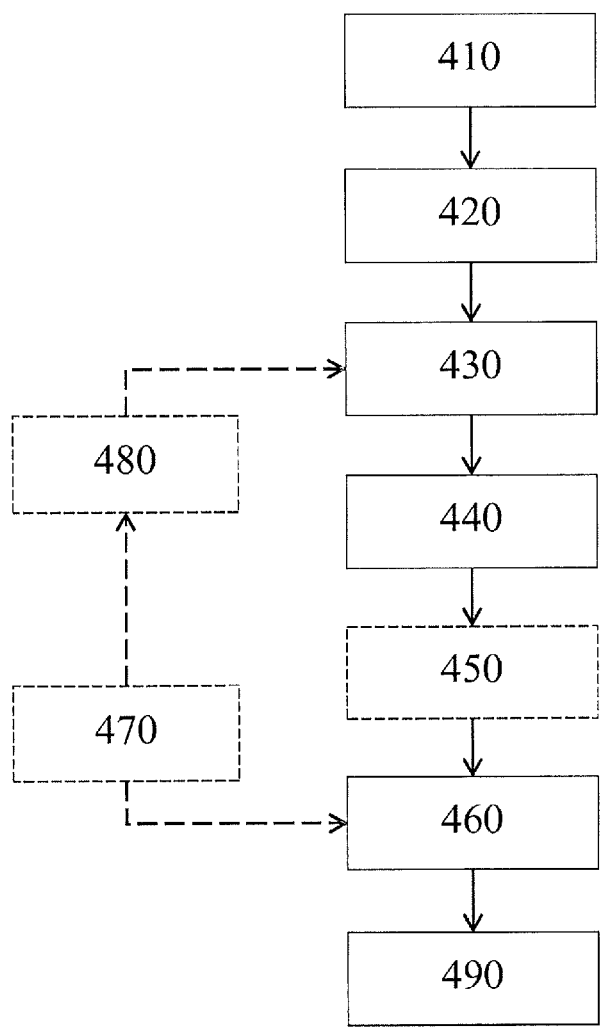
FIG. 4B is a block diagram showing self-calibration according to embodiments.

Embodiments of methods for self-calibration comprise the following steps, illustrated in FIG. 4B:

Steps 410, 420, 440, 450, 460 and 490 correspond to the same steps presented above, relating to FIG. 4A.

Step 430 corresponds to step 430 described above, except for the optional step 485 of inputting the distance z, since the distance z is not previously known. Instead, the distance z is determined by being measured in Step 470, for example by means of a distance sensor or a time-of-flight sensor. According to an embodiment, the distance z is input or fed back to the detection the projected visible light area, feature, pattern or symbol of Step 430 in step 480, thereby providing a more intelligent or efficient area, feature, pattern or symbol detection as described above for Step 430.

According to an embodiment, the calibration process described above is performed more than once, for example two or three times, in order to ensure proper calibration.

Embodiments of the operation of a calibrated or aligned thermography arrangement are illustrated in FIG. 8.

Operation of Calibrated Thermography Arrangement

Figure 7:
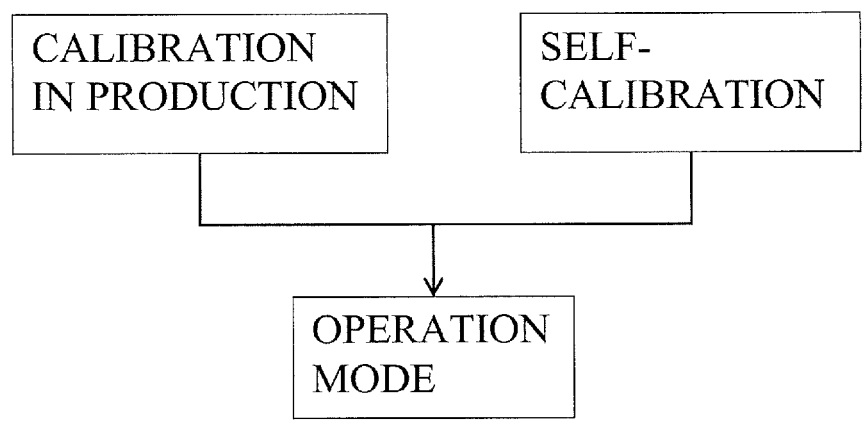
FIG. 7 is a schematic overview of different modes according to embodiments.

Once a thermography arrangement has been calibrated according to any of the embodiments presented above, relating to FIGS. 4A and 4B, the arrangement is ready for operation. In operation, the thermography arrangement will work in the same way, regardless of whether the calibration has been performed in production or during use, as illustrated in FIG. 7.

A thermography arrangement that has been calibrated in production, as well as a self-calibrating thermography arrangement, is calibrated or aligned after Step 490 according to embodiments of the method embodiments presented above. After the calibration in Step 490, a projection produced by the projecting system 22 will be aligned with the IR radiation captured by the IR imaging system 18. In other words, after Step 490, the thermography arrangement is ready to operate, and may further, according to embodiments, be used to determine the distance to an observed scene, i.e. to perform the function of a distance sensor, during operation. According to an embodiment, the thermography arrangement may be used to determine the distance to an observed real world scene using the following relationship:

$$z = \frac{C_0}{d_{(pixvis)} - C_1} \quad \text{(Eq. 2)}$$

wherein the parameters corresponds to the parameters of Eq. 1 above.

As is readily apparent to a person skilled in the art, all of the parameters of Eq. 2 may for example be expressed as divided into an x direction component and a y direction component, or expressed as polar coordinates, depending on circumstances.

As is readily apparent to a person skilled in the art, the relationship in Eq. 2 may alternatively be used to determine any of the parameters $c_0$, $c_1$, z or $d_{(pix\ vis)}$ if the remaining parameters of the equation are known.

In operation, according to embodiments shown in FIG. 8, a calibrated thermography arrangement produces a visible light projection onto an observed real world scene, in alignment with IR radiation emitted from the observed real world scene and received by an IR sensor of an IR imaging system of the thermography arrangement, by obtaining or retrieving the distance z to the observed object, objects or observed real world scene; determine the pixel displacement $d_{pix\ vis}$ based on the distance z and calibration parameters $C_0$ and $C_1$ determined in production or during self-calibration, as described above, and method embodiments comprising the following steps:

Step 810: Detecting IR radiation emitted from the observed real world scene, using an IR imaging system 18, according to a first field of view and creating a visible representation of the detected IR radiation, in the form of an IR image. Typically, the detected IR radiation reaches an IR sensor array goof the IR imaging system 18, having a certain first field of view.

Step 820: Retrieve the distance z from the thermography arrangement 10 to the observed real world scene or object.

According to embodiments, the distance z may be for instance be retrieved by calculation using relationships with known parameter and/or parameters that the thermography arrangement is enabled to retrieve, for instance the relationship of Eq. 2 presented above. According to alternative embodiments, the distance z may be retrieved by use of a distance sensor integrated in or coupled to the thermography arrangement. In one example the distance is retrieved by use of double visible light sensors, detection of a laser spot in an IR image, the position of the focus lens or by use of a distance sensor integrated in or coupled to the thermography arrangement in per se known manners.

According to an embodiment, the retrieved distance z is used as input to Step 830.

Step 830: Calculate the pixel displacement $d_{pix\ IR}$ between a visual image projected by the visible light projecting system 22, according to a first field of view, and an IR image, as a visible representation of infrared (IR) radiation emitted from said observed real world scene detected according to a first field of view, captured by the IR imaging system 18.

According to embodiments, the relationship between the pixel displacement $d_{pix\ IR}$ and the pixel displacement $d_{pix\ vis}$, between a visual image projected by the visible light projecting system 22 and a visible light image captured by the visible light imaging system 14, as a function of the distance to the observed object, objects or observed real world scene, is known from production or calibration. One way of describing the relationship is:

$$d_{pix\ IR} = f(d_{pix\ vis}, z) \quad \text{(Eq. 3)}$$

According to an embodiment, the relationship is a mapping function, for instance expressed as a lookup table, wherein every value for $d_{pix\ vis}$ has a corresponding value for $d_{pix\ IR}$, based on the value of the distance z. For simplicity, each displacement is here formulated as one value $d_{pix\ vis}$ or $d_{pix\ IR}$. However, the displacements may comprise more than one component. Typically for an image a displacement is described in terms of an x component and a y component, for instance in the form of a vector (e.g. $dx_{pix\ vis}$, $dy_{pix\ vis}$), or as polar coordinates.

According to embodiments described above the distance z is known from Step 820. Therefore, in order to determine $d_{pix\ IR}$ we first need to know $d_{pix\ vis}$. If the displacement $d_{pix\ vis}$ is not already known, it may as described above be determined using the known parameters $C_0$ and $C_1$ and the relationship presented in Eq. 2.

When $d_{(pix\ vis)}$ is known or determined, the pixel displacement $d_{pix\ IR}$ is determined by using the relationship of Eq. 3 according to any of the embodiments presented above.

Step 840: Present the IR image onto the observed real world scene in alignment with the observed real world scene. In other words, presenting the IR image onto the observed real world scene in alignment with IR radiation emitted from the observed real world scene.

According to an embodiment, the IR image is aligned to the observed real world scene, or in other words aligned to the IR radiation emitted from the observed real world scene, by compensating for the pixel displacement $d_{pix\ IR}$ determined in Step 80. The alignment, or compensation, may be performed in the processor 13 of the thermography arrangement 10, or in another processor integrated in or coupled to any of the components of the thermography arrangement 10.

According to an embodiment, presenting the aligned IR image onto the observed real world scene comprises transferring an aligned IR image to the visible light projecting system 22 and projecting the aligned IR image onto the observed real world scene using the visible light projecting system 22.

According to an alternative embodiment, presenting the aligned IR image onto the observed real world scene comprises transferring an IR image to the visible light projecting system 22, aligning the IR image using a processor integrated in or coupled to the visible light projecting system 22, and projecting the aligned IR image onto the observed real world scene using the visible light projecting system 22.

According to an embodiment, $FOV_{proj}$ is smaller than $FOV_{IR}$. According to this embodiment, the visible light projecting system 22 will not be adapted to display the entire IR image. Therefore, a part of the IR image that corresponds to the $FOV_{proj}$ is obtained, for example by selecting, cropping or cutting out said part from the IR image, and then projected onto the observed real world scene.

According to an embodiment, the IR image is aligned to the observed scene, or in other words aligned to the IR radiation emitted from the observed scene, by compensating for the pixel displacement $d_{pix\ IR}$ determined in Step 830. The alignment, or compensation, may be performed in the processor 13 of the thermography arrangement 10, or in another processor integrated in or coupled to any of the components of the thermography arrangement 10.

According to an embodiment, presenting the aligned IR image onto the observed scene comprises transferring an aligned IR image to the visible light projecting system 22 and projecting the aligned IR image onto the observed scene using the visible light projecting system 22.

According to an alternative embodiment, presenting the aligned IR image onto the observed scene comprises transferring an IR image to the visible light projecting system 22, aligning the IR image using a processor integrated in or coupled to the visible light projecting system 22, and projecting the aligned IR image onto the observed scene using the visible light projecting system 22.

In one embodiment the visible light projecting system 22 FOV is completely comprised in the FOV of the IR imaging system 18. According to this embodiment, aligning the IR image to the detected infrared (IR) radiation emitted from said observed real world scene comprises obtaining the part of the IR image that corresponds to the $FOV_{proj}$, based on the pixel displacement $d_{pix\ IR}$ and $FOV_{proj}$, for example by selecting, cropping or cutting out said part from the IR image.

According to one embodiment the visible light projecting system 22 FOV only partly overlaps with the FOV or the IR imaging system 18, According to this embodiment, aligning the IR image to the detected infrared (IR) radiation emitted from said observed real world scene comprises obtaining the part of the IR image that that lie within the overlapping part of the FOVs of the two systems.

According to one embodiment aligning the IR image to the detected infrared (IR) radiation emitted from said observed real world scene further comprises obtaining parts of the IR image where the corresponding detected infrared (IR) radiation emitted from said observed real world scene is fulfilling a condition, e.g. is above a threshold, below a threshold or within an interval According to one embodiment aligning the IR image to the detected infrared (IR) radiation emitted from said observed real world scene further comprises obtaining parts of the IR image is based on areas indicated by the thermography arrangement 10 operator, using input features of the IR imaging system 10, or based on object detection features implemented in the processor 13, detecting parts of the IR image as objects.

According to an embodiment, illustrated in FIG. 2, the visible light imaging system 14 has the largest FOV, the IR imaging system 18 has the second largest FOV and the projecting system 22 has the smallest FOV. However, any other relationship in FOV sizes is conceivable, depending on circumstances such as price, performance and end customer requirements.

Self-Adjustment

According to another embodiment, the thermography arrangement is self-adjusting or self-aligning, or in other words adjusts or aligns itself during operation.

In operation, according to embodiments the thermography arrangement produces a visible light projection onto an observed real world scene, in alignment with IR radiation emitted from the observed real world scene, by: receiving IR radiation emitted from an observed real world scene using an IR sensor of an IR imaging system of the thermography arrangement; converting the received IR radiation into a visible representation in the form of an IR image; obtaining or retrieving the distance z from the thermography arrangement to the observed object, objects or observed real world scene; determining the pixel displacement $d_{pix\ vis}$; converting pixel displacement $d_{pix\ vis}$ to pixel displacement $d_{pix\ IR}$; aligning the IR image by compensating for the pixel displacement $d_{pix\ IR}$; and projecting the aligned IR image onto the observed real world scene, thereby obtaining presentation of an IR image onto a observed real world scene, in alignment with the IR radiation emitted from the observed real world scene.

According to embodiments, the parallax distances and pointing error between the visible light projecting system 22 on the one hand and visible light imaging system 14 and IR imaging system 18, respectively, on the other hand are not known, since the visible light projecting system 22 is a component that is physically separated from the other optical systems 14, 18, at an unknown and non-constant distance from the optical systems 14, 18. This embodiment is shown in FIG. 1C and further described above, in the section Separate components embodiment.

During such a self-adjustment, self-alignment, or alignment during operation, the following parameters are known from production: the parallax distance and pointing error between the visible light imaging system 14 and the IR imaging system 18; the field of view of the visible light imaging system 14 ($FOV_{vis}$); the field of view of the IR imaging system 18 ($FOV_{IR}$); and the translation, or mapping function, $f(z)$ between image coordinates of an image captured using the visible light imaging system 14 and an image captured using the IR imaging system 18, as a function of the distance z to the observed real world scene. According to embodiments, the aim of the self-alignment is to estimate parallax distance, the pointing error and the field of view of the projecting system 22 ($FOV_{proj}$), in order to enable alignment of the different optical systems of the thermography arrangement.

Referring to FIG. 4B, embodiments of methods are illustrated. Steps 410, 420, 430, 440, 450, 470 and 480 correspond to the same steps presented above, relating to FIG. 4B. Embodiments of self-adjustment further comprise the following steps, illustrated in FIG. 6:

Step 610: Convert the calculated pixel displacement in the x and y direction ($dx_{(pix\ vis)}$, $dy_{(pix\ vis)}$), between the light projected by visible light projecting system 22 and the image captured by the visible light imaging system 14, to pixel displacement in the x and y direction ($dx_{(pix\ IR)}$, $dy_{(pix\ IR)}$), between the light projected by visible light projecting system 22 and an image captured by the IR imaging system 18, using the translation, or mapping function, shown in Eq. 3 above, between image coordinates of an image captured using the visible light imaging system 14 and an image captured using the IR imaging system 18, known from production.

Step 620: Present, or project, visible light in alignment with IR radiation received from the observed real world scene.

According to an embodiment, Step 620 comprises transferring the IR image in the form of an IR image signal, from the processor 13 to the visible light projecting system 22, whereby the projector 29 of the visible light projecting system 22 projects the resampled IR image data onto the observed real world scene. The IR image data is thereby projected in alignment with the observed real world scene, in other words the IR image data is projected in the direction from which the corresponding detected IR radiation information was emitted.

In contrast to a thermography arrangement that has been calibrated in production or self-calibrated during operation, the self-alignment described above does not result in calibration of the thermography arrangement. Instead, the self-alignment, or self-adjustment, is performed continuously during operation, through the conversion or mapping of Step 610.

According to an embodiment, the calibration process described above is performed more than once, for example two or three times, in order to ensure proper adjustment.

Projection onto a Non-Flat Surface

In FIG. 2, the observed real world scene is illustrated as a flat surface 200. However, the object, objects or observed real world scene that a user of the IR imaging system 10 is analyzing will rarely consist of a flat surface that is perfectly orthogonal to the optical axis of the visual light projector 22.

Figure 3A:
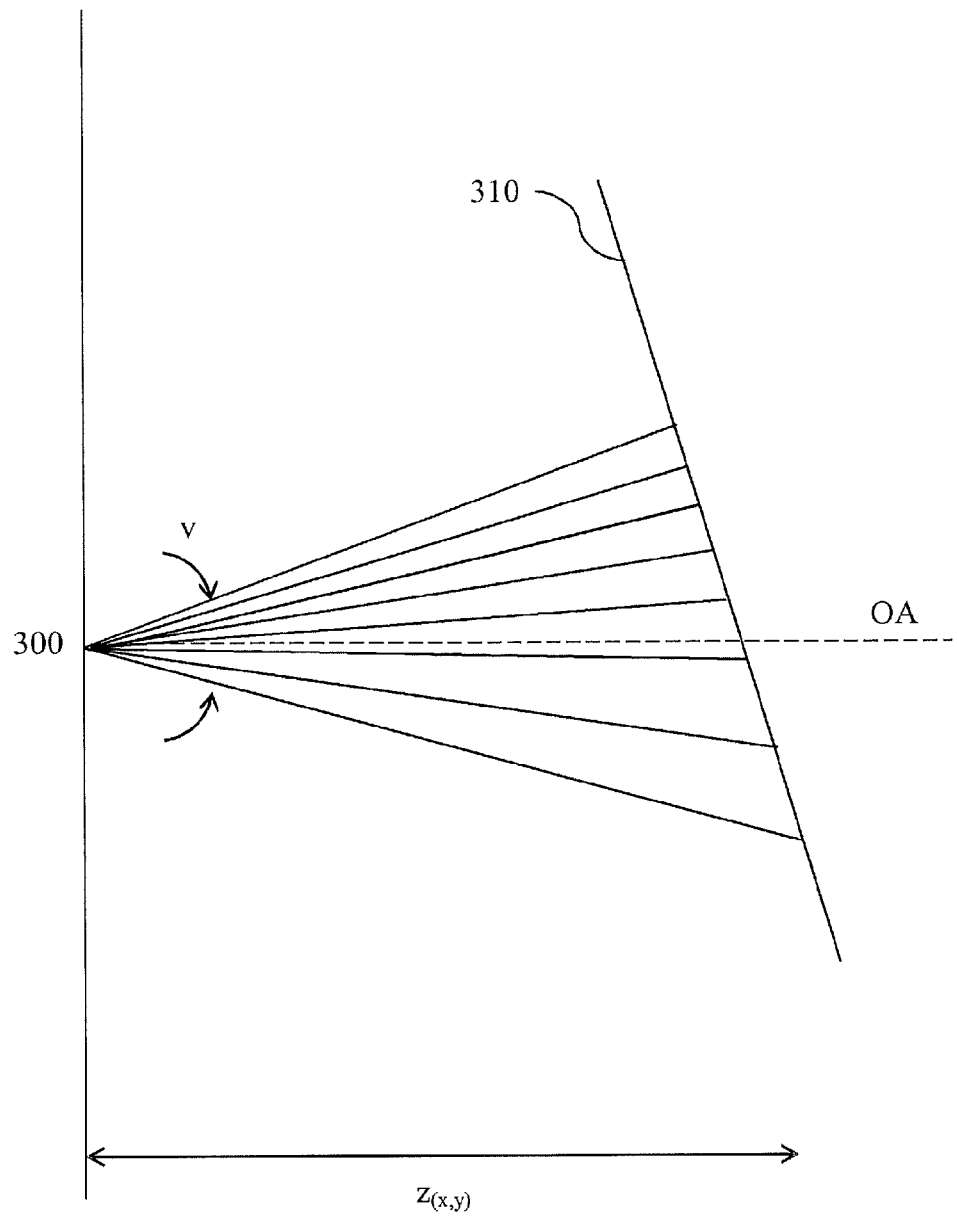
FIG. 3A shows a schematic view of an optical system of an IR imaging system used on a surface that is non-orthogonal to the optical axis of a visual light projector, according to an exemplifying use case enabled by embodiments of the invention.

In FIG. 3A, an optical system of the IR imaging system used on a surface that is not orthogonal to the optical axis of the visual light projector 22 is shown. The surface in FIG. 3A is inclined in one dimension in relation to the optical axis of the visual light projecting system 22. However, the surface may just as well be inclined in two dimensions relation to the optical axis of the visual light projecting system 22. In use of the IR imaging system 10, this would relate for example to an operator using the device 10 to project a visible representation of detected IR radiation information onto a heated floor that is being investigated. Since the operator is standing on the floor, this makes it difficult for him or her to hold the device 10 such that the optical axis of the projecting system 22 is orthogonal to the floor.

Figure 3B:
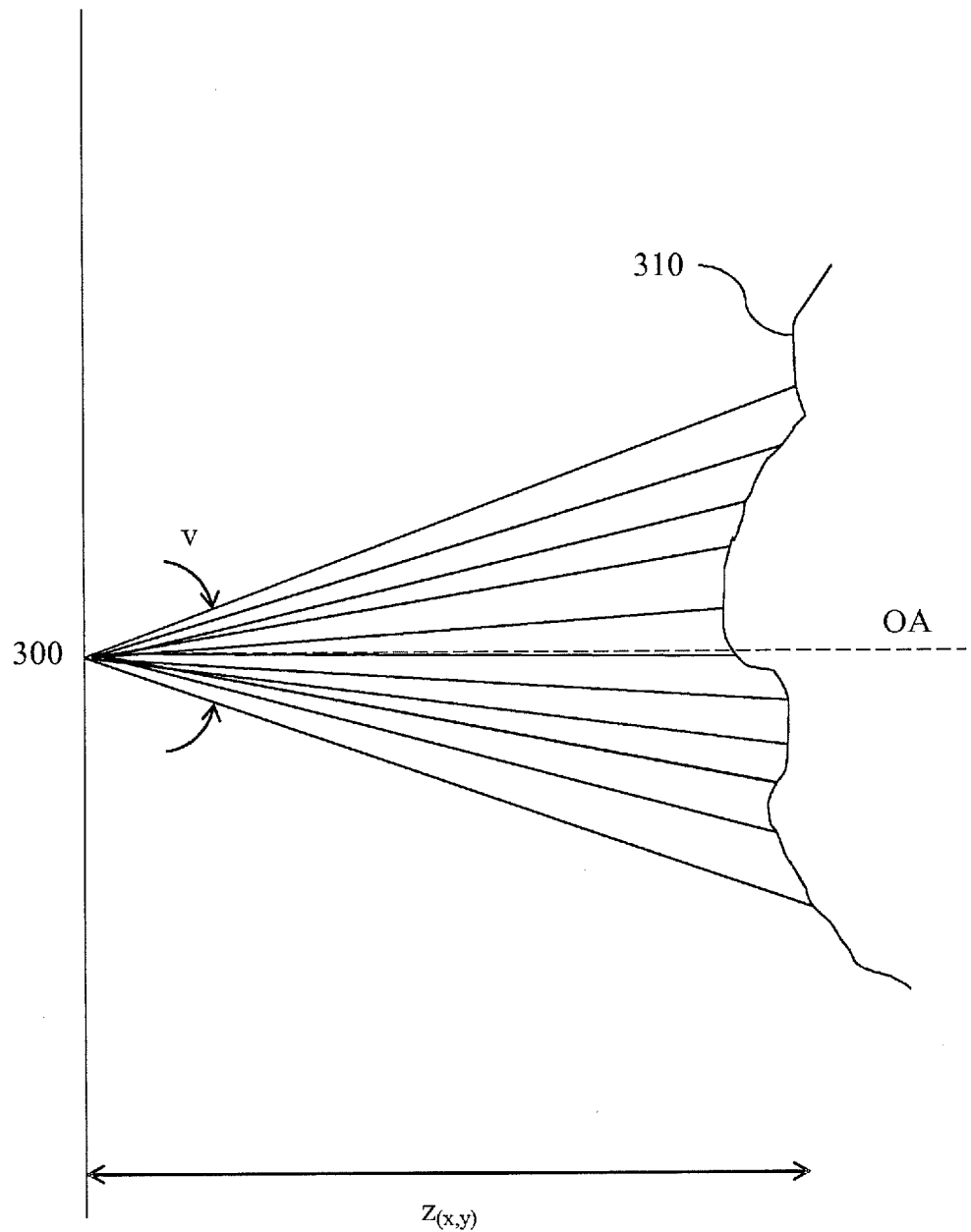
FIG. 3B shows a schematic view of an optical system of a thermography arrangement used on a non-flat surface, according to another exemplifying use case enabled by embodiments of the invention.
Figure 3C:
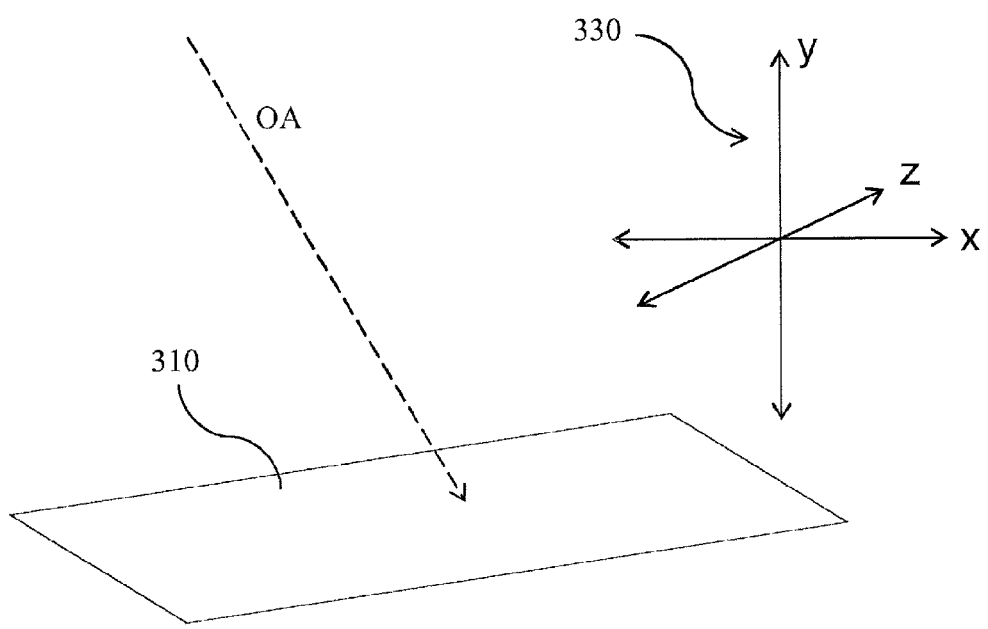
FIG. 3C shows an exemplary embodiment wherein the optical axis OA of a projector of a thermography arrangement falls obliquely onto a surface in a observed real world scene.

This exemplary embodiment is further illustrated in FIG. 3C, where the optical axis OA of the projecting system 22 (not shown in the figure) falls obliquely onto an investigated surface, in this case a floor 310, in such a direction that it is inclined in two dimensions, by way of example the x- and z-directions of the coordinate system 330.

An example of a non-flat surface 310 is shown in FIG. 3B, for which different embodiments of the present invention can also advantageously be used, according to the method described further below, especially for embodiments of the invention where several distances to the observed real world scene are retrieved as described below. The non-flat surface 310 of FIG. 3B is one example of what such a surface might look like. Since the surface is a the surface of a real world object, any 3D shape is possible, comprising any combination of flat surface parts, curved parts and/or embossed parts.

In FIGS. 3A and 3B, an optical system 300 with an optical axis OA and a FOV with the angle v is shown. Only one optical system is shown in FIGS. 3A and 3B, instead of all three optical systems as shown in FIG. 2. This is merely for the sake of simplicity of the drawing. In the explanations below, the optical system 300 may alternately represent the visible light imaging optical system 14, the IR imaging system 18 or the visible light projector 22.

Distance Mapping

As described above in Step 512, in connection with FIG. 5, more than one distance value, i.e. a plurality of distance values, from the thermography arrangement 10 to more than one point in the observed real world scene may be retrieved or calculated and turned into a distance map, wherein each value in the distance map corresponds to a retrieved distance values from the thermography arrangement 10 to a point in the observed scene. The distance map may also be referred to as distance image.

According to an embodiment, a distance map enables projection of the visual representation of the IR image onto the observed real world observed real world scene to be aligned with the object or objects comprised in the observed real world scene at different distances or depths from the thermography arrangement 10, since each projected pixel of the aligned IR image may be adapted to be projected at the right distance, dependent on the distance map.

According to an exemplary embodiment, the IR image is projected as a visible light pattern onto the observed real world scene in alignment with the object or objects comprised in the observed real world scene at different distances from the thermography arrangement 10, by adapting each projected pixel of the aligned IR image with varying density, dependent on the distance map and preset conditions. For example, the thermography arrangement may be adapted to project pixels more sparsely if the retrieved distances in the distance map, $z_i$ to the points i on the object, objects or observed real world scene onto which the pixels are to be projected exceeds a preset threshold. In this way, a more detailed projection is provided for projected parts of the observed real world scene that are close to the thermography arrangement 10. Alternatively, the thermography arrangement 10 may instead be adapted to project pixels more closely if the distances $z_i$ exceed a preset threshold, thereby providing a more detailed projection for projected parts of the observed real world scene that are far from the thermography arrangement 10. According to a third exemplary embodiment, the thermography arrangement 10 may be adapted to project pixels more sparsely or closely when the distances $z_i$ are within certain intervals. There may be one or more intervals and/or thresholds. The intervals and/or thresholds may be predefined and stored in the memory 15 thermography arrangement 10 or selected and input by an operator of the thermography arrangement 10, using input features comprised in the one or more control devices 19 communicatively coupled with the interface medium 21 of the IR imaging system 10.

In order to achieve the projection adaptations described above, image processing features of the processor 13 may according to embodiments resample the IR image data, dependent on the predefined or operator input interval, intervals, threshold, threshold or other values describing the distribution of the pixels to be projected. After resampling of the IR image data has been performed, the resampled IR image is transferred, in the form of an IR image signal, from the processor to the visible light projecting system 22. The projector 29 of the visible light projecting system 22 projects the resampled IR image data onto the observed real world scene. The IR image data is thereby projected in alignment with the observed real world scene, in other words the IR image data is projected in the direction from which the corresponding detected IR radiation information was emitted.

According to an exemplary embodiment, the IR image is projected as a visible light pattern onto the observed real world scene in alignment with the object or objects comprised in the observed real world scene at different distances from the thermography arrangement 10, by adapting each projected pixel of the aligned IR image with varying size, dependent on the distance map. The projector 29 is enabled to project larger pixels onto points in the observed real world scene that are found to be at a greater distance, represented by the distance map, from the IR imaging system 10, i.e. at a greater distance from the operator, and smaller or regular sized pixels when the detected distance is smaller. According to another embodiment, the projector is further adapted to increase/decrease the size of the pixels projected as a function of the detected distances to the observed real world scene, e.g. having a linear dependency.

In this way, pixels will appear more similar in size to the operator of the thermography arrangement 10 when projected at objects in the observed real world scene located at different distances from the thermography arrangement 10. In particular, through the adapted frequency (sparse or close) and/or amplitude (small or large) of the pixels to be projected, aligned projection onto surfaces that are non-flat and/or not orthogonal to the optical axis of the visible light projector is enabled. For example, if an operator aims the IR imaging system 10 at a heated floor on which the operator is standing or at a wall of a building in front of the operator, it is likely that the surface will not be orthogonal to the optical axis of the visible light projecting system 22.

As stated above, according to different exemplary embodiments, the projector 22 may comprise a laser projector, a liquid crystal display (LCD), a digital light processing (DLP) projector or any other suitable type of projector known in the art.

The use of a laser projector may according to some embodiments be an advantageous choice, since laser projectors have a high Depth of Field, which renders good projection results onto non-flat surfaces.

Different equivalent terms for the projector used in this text include visible light projector, visible light pattern projector, visible image/imaging projector, from which terms the purpose and function of the projector should be readily understood.

Detection of Projected Visible Light Pattern

As mentioned above, the visible light projector 22 projects visible light, that may be in the form of an area or a predetermined identifiable feature, for example in the form of a symbol or pattern, which is detected in an image captured by the visible light imaging system 14. The projection may include all or part of the pixels comprised in the FOVproj, and may have a human or computer recognizable form or not. For simplicity, the projected visible light that is to be detected is described as a pattern or a symbol below.

Detection of a symbol or pattern in an image may be performed using any suitable detection method, per se known in the art, for example feature extraction, template matching, segmentation, edge detection, thinning, similarity measures, masking, intensity thresholding or filtering.

According to a non-computationally expensive exemplary embodiment, a first and a second image of a observed real world scene are captured in close succession using the visible light imaging system 14 while the visible light projecting system 22 "flashes" a predetermined identifiable feature, for example in the form of a symbol or pattern, during a short period of time. For instance, before the second image is captured, the predetermined symbol or pattern is projected onto the observed real world scene using the visible light projector 22, the FOV of the visible light imaging system 14 at least partially overlapping with the FOV of the visible light projector 22. Thereby, the second image comprises substantially the same observed real world scene as the first image, but with the addition of the projected pattern. According to this embodiment, the processor 13 that controls the activation of the projecting system 22 synchronizes the projection with the capturing of images performed by the visible light imaging system 14. This enables the visible light imaging system 14 to capture two subsequent frames, wherein one frame comprises at least part of the projected symbol or pattern superimposed onto the observed real world observed real world scene, while the other frame comprises the same view of the observed real world scene without the projection. By subtracting the first image from the second image a difference image is obtained, comprising the detected symbol or pattern. This exemplary pattern extraction method may for example be advantageous to use if the observed real world scene in itself contains much information, or "noise".

Alarm Functionality

According to an embodiment, different aspects of the invention described herein may provide an alarm, thereby notifying or alerting a user when an alarm criterion is fulfilled, for example indicating that a possible abnormality of some sort has been detected. The alarm may be visible or audible to the user.

According to embodiments wherein the alarm is visible, the projecting system 22 may be controlled, for example by the processor 13, to project the aligned visible light onto the observed real world scene if one or more of the following criteria are fulfilled: one or more parts of the observed real world scene has a measurement value above a preset threshold limit; one or more parts of the observed real world scene has a measurement value below a preset threshold limit; one or more parts of the observed real world scene has a measurement value within a preset interval; or one or more parts of the observed real world scene has a measurement value outside a preset interval.

According to embodiments, the measurement values may relate to temperature or thermal information, effect or power (W, $W/m^2$), humidity or moisture, for example indicated as a percentage.

According to embodiments, the criteria mentioned above are alarm criteria, intended to alert the user that a possible deviation or abnormality has been detected. As an example a criterion can be that all or parts of the detected infrared (IR) radiation emitted from said observed real world scene is above a predefined threshold.

According to embodiments, one or more criteria for controlling the projection may be preset or selected by the user through input using for example one or more of the control devices 19.

According to an embodiment, the projecting system 22 is controlled to provide an alarm by:
  if the projector was already projecting: flash, increase brightness and/or adjust the projection color of the projected visible light; and/or project visible light only onto the part or parts of the observed real world scene wherein said one or more criteria are fulfilled; or
  if the projector was not projecting: start projecting visible light onto the part or parts of the observed real world scene wherein said one or more criteria are fulfilled or onto the entire observed real world scene,
thereby alerting the user that a possible deviation or abnormality has been detected.

According to different embodiments, an alarm may be provided by use of the visible light projecting system 22, for instance by controlling the visible light projecting system 22 to start projecting when one or more of the an alarm criteria above is fulfilled, if the visible light projecting system 22 was not already projecting or to start blinking or flashing if it was already projecting light onto the observed real world scene.

In other words, according to embodiments, the visible light projecting system 22 may be controlled to provide an alarm by:
  if the projecting system 22 was already projecting: flashing, increasing brightness, adjusting the projection color and/or project visible light only onto the part or parts of the image wherein said one or more criteria are fulfilled; or
  if the projecting system 22 was not projecting: start projecting visible light onto the part or parts of the image wherein said one or more criteria are fulfilled or onto the entire observed real world scene, thereby alerting the user that a possible deviation or abnormality has been detected.

According to other embodiments, the visible light projecting system 22 may be adapted to highlight an identified area relating to the alarm criterion by starting to project or flash light onto that identified area or an area related to the identified area, in close proximity to the identified area. According to different embodiments, the visible light projected may comprise light of any suitable color, color range, grey scale range and/or intensity and be presented in any suitable size, shape and/or pattern.

According to another embodiment, the thermography system 10 may comprise one or more speaker units and be adapted to provide an alarm in the form of an audible signal.

Further Embodiments

In one embodiment the retrieved distance parameter z corresponds to the focusing distance if the visible light projector 22 is projecting a visible light pattern onto a certain object that should be in focus. Therefore, this information can be used for exact focusing of the thermography arrangement 10.

According to an exemplary embodiment, the visual light imaging projector (visual light pattern projector) 22 is a laser projection device. Laser projection devices are focus free, meaning that the focus lens has a focal point that is fixed at its hyper focal distance. Rather than having a method of determining the correct focusing distance and setting the lens to that focal point, a focus free lens relies on depth of field to produce acceptably sharp images. Therefore, no focusing of the laser projection device is needed. According to other exemplary embodiments, any other appropriate type of projection device may be used, according to circumstances.

According to an embodiment there is provided a computer system having a processor being adapted to perform in any of the steps or functions of the embodiments presented above.

According to an embodiment of the invention, there is provided a computer-readable medium on which is stored non-transitory information for performing a method according to any of the embodiments presented above.

According to further embodiments, there is provided computer-readable mediums on which is stored non-transitory information for performing any of the method embodiments described above.

According to an embodiment, the user can capture a visible light image of the observed real world scene while projecting visible light onto the observed real world scene, in alignment with IR radiation emitted from the observed real world scene, and save the captured image for later viewing or for transfer to another processing unit, such as a computer, for further analysis and storage.

In alternative embodiments, disclosed alignment methods can be implemented by a computing device such as a PC, communicatively coupled to the thermography arrangement, and/or an FPGA-unit specially adapted for performing the steps of the method of the present invention, and/or a general processing unit 2 according to the description in connection with FIG. 2. The computing device may further comprise the memory 15 and/or the display unit 3.

Further Advantages

According to embodiments of the invention described herein, the projection of visible light onto a observed real world scene is performed in real time or near real time (live) on site, or in other words live, thereby enabling a user easier interpretation and analysis of an observed real world scene since the user is presented with relevant information directly onto the observed real world scene. As the visible light information, comprising a visible representation of IR radiation received from the observed real world scene, is projected onto said observed real world scene in real time or in near real time (live), the user does not have to look away from the observed real world scene in order to relate received IR radiation information with what he or she sees in the observed real world scene. Furthermore, according to embodiments of the present invention the visible light is projected onto the observed real world scene in alignment with the observed real world scene, or in other words in alignment with the IR radiation emitted from the observed real world scene, thereby further aiding the user in relating the projected visible light information with the observed real world scene and further facilitating interpretation and analysis of the observed/investigated observed real world scene.

According to embodiments wherein additional information is projected onto the observed real world scene, the additional information further facilitates interpretation and analysis of the observed or investigated observed real world scene. Furthermore, embodiments of the present invention enable that projected additional information is projected in alignment with and/or to scale onto the observed real world scene. Additional information as presented above, possibly selected by the user using one or more interaction devices integrated in or connected to the thermography arrangement 10, may aid a user in relating the projected visible light representation of IR radiation received from the observed real world scene to the observed real world scene in front of him/her. For example, the additional information may comprise additional measured or calculated data such as one or more temperatures, one or more moisture levels, emissivity and/or effect/power (W or $W/m^2$) projected onto the observed real world scene in relevant locations.

What is claimed is:

1. A method of enabling easier interpretation and analysis of an observed real world scene by presenting a visible representation of infrared (IR) radiation information, based on IR radiation emitted from said observed real world scene, onto said observed real world scene, using a thermography arrangement comprising an IR imaging system and a visible light projecting system, the method comprising:

capturing, by said IR imaging system, IR radiation information based on detected IR radiation emitted from said observed real world scene;

creating a visible representation of said captured IR radiation information;

detecting distance information associated with said observed real world scene in relation to said thermography arrangement;

adjusting said visible representation of said captured IR radiation information based on said detected distance information such that said adjusted visible representation of said captured IR radiation information, when projected onto said observed real world scene, is aligned with said detected IR radiation emitted from said observed real world scene; and projecting, by said visible light projecting system, said adjusted visible representation of said captured IR radiation information onto said observed real world scene in alignment with said detected IR radiation emitted from said observed real world scene.

2. The method of claim 1, further comprising:

creating a visible representation of additional information dependent on a signal received from a predetermined source comprising at least one of: user input; a processor; a memory; a sensor; and/or a measuring device; and creating a combined IR image comprising said adjusted visible representation of said captured IR radiation information and said visible representation of additional information, wherein said projecting comprises projecting said combined IR image onto said observed real world scene.

3. The method of claim 1, wherein detecting said distance information comprises:

retrieving at least one distance from said thermography arrangement to said observed real world scene; and calculating at least one length and/or a size of an area in said observed real world scene based on said retrieved distance.

4. The method of claim 2, wherein said additional information comprises length measurement information, a guiding help grid, grid lines, orientation information, temperature-related information, writing/text, a sketch, and/or a drawing, wherein said length measurement information enables projection to scale of the length measurement information onto said observed real world scene, and wherein said orientation information enables a user to interpret an orientation of parts of the observed real world scene.

5. The method of claim 4, wherein said length measurement information as additional information is is rendered in the form of a ruler to scale when projected onto the observed real world scene.

6. The method of claim 4, wherein said orientation information as additional information is rendered in the form of a level or a bubble level when projected onto the observed real world scene.

7. The method of claim 1, wherein said visible light projecting system comprises a laser projector.

8. The method of claim 2, wherein said additional information comprises graphical elements presented in a graphical user interface (GUI) on a display of said thermography arrangement, wherein said additional information is input through touch functionality, and wherein the method further comprises enabling a user to control what is being presented in said GUI on said display of said thermography arrangement, by means of control devices integrated in or coupled to said thermography arrangement.

9. The method of claim 8, wherein said graphical elements represent a selection of:
   measurement values presented as temperature, humidity, emissivity, or effect (W or $W/m^2$);
   one or more point and/or area markers for selecting one or more points and/or areas of interest;
   one or more input fields for user input; and
   one or more selectable menu items.

10. The method of claim 1, wherein said projecting of said visible representation of said captured IR radiation information onto said real world scene is performed in real time, live, or near real time.

11. The method of claim 1, further comprising controlling the visible light projecting system to provide an alarm if one or more of the following alarm criteria are fulfilled:
   one or more parts of the observed real world scene has a measurement value above a preset threshold limit;
   one or more parts of the observed real world scene has a measurement value below a preset threshold limit;
   one or more parts of the observed real world scene has a measurement value within a preset interval; or
   one or more parts of the observed real world scene has a measurement value outside a preset interval.

12. The method of claim 11, further comprising adjusting brightness levels and/or color values of said visible light projected based on brightness levels and/or color values of said one or more parts of the observed real world scene onto which the visible light is projected, wherein said visible light projecting system is controlled to provide an alarm by:
   if said visible light projecting system was already projecting: flashing, increasing brightness and/or adjusting color values of said projected combined IR image; and/or projecting visible light only onto said one or more parts of the observed real world scene wherein said one or more criteria are fulfilled; or
   if said visible light projecting system was not projecting: projecting visible light onto said one or more parts of said real world scene where said one or more criteria are fulfilled or onto said entire observed real world scene, thereby alerting the user.

13. The method of claim 1, wherein the projecting comprises projecting in accordance with a user selected projection mode selected from different projection modes comprising:

projecting the adjusted visible light-representation of the captured IR radiation information onto the entire observed real world scene;
projecting a portion of the adjusted visible representation of the captured IR radiation information onto corresponding one or more objects comprised in the observed real world scene;
projecting a corresponding portion of the adjusted visible representation of the captured IR radiation information onto selected parts of one or more objects comprised in the observed real world scene;
projecting a visible representation of a marker onto the observed real world scene;
projecting a visible representation of a marker on hot spots or objects; or
projecting a visible representation of a marker on cold spots or objects.

14. The method of claim 3, wherein more than one distance is retrieved and said more than one distance are used to create a distance map or distance image, wherein the distances of said distance map or distance image are used to adjust the visible representation of the captured IR radiation information such that the visible representation of the captured IR radiation information, when projected, is aligned with the observed real world scene at different depths dependent on the distance map, and wherein the method further comprises projecting pixels of the visible representation with varying density, dependent on the distances of the distance map, or distance image, and preset conditions.

15. The method of claim 1, wherein said thermography arrangement further comprises a visible light imaging system, and wherein said adjusting is further based on information captured by said visible light imaging system.

16. A thermography arrangement to enable easier interpretation and analysis of an observed real world scene by presenting a visible representation of infrared (IR) radiation information based on IR radiation emitted from said real world scene, onto said observed real world scene based on IR radiation emitted from said observed real world scene, wherein said visible representation of IR radiation information is projected in alignment with said IR radiation emitted from said observed real world scene, the arrangement comprising:
   an IR imaging system configured to capture IR radiation information based on detected IR radiation emitted from said observed real world scene according to a first field of view;
   a visible light projecting system configured to project visible light onto said observed real world scene according to a second field of view, at least partially overlapping said first field of view; and
   a processor configured to execute instructions to cause said thermography arrangement to perform operations comprising:
      creating a visible representation of said captured IR radiation information,
      detecting distance information associated with said observed real world scene in relation to the thermography arrangement, and
      adjusting said visible representation of said captured IR radiation information based on said detected distance information such that said adjusted visible representation of said captured IR radiation information, when projected onto said observed real world scene, is aligned with said detected IR radiation emitted from said observed real world scene, wherein said visible light projecting system is further configured to project said adjusted visible representation of said captured IR radiation information onto said observed real world scene in alignment with said detected IR radiation emitted from said observed real world scene.

17. The arrangement of claim 16, further comprising a visible light imaging system configured to capture a visible light image of said observed real world scene, according to a third field of view, said third field of view at least partially overlapping said first and/or second field of view; and said processor further configured to adjust the combined IR image using the visible light image captured by said visible light imaging system.

18. The arrangement of claim 16, wherein the processor is a field programmable gate array (FPGA) or another processing device configurable using a hardware description language (HDL).

19. A non-transitory computer-readable medium on which is stored machine-readable instructions executable to control a processor to perform the method of claim 1.

20. The arrangement of claim 16, wherein the operations further comprise:
    creating a visible representation of additional information dependent on a signal received from a predetermined source comprising at least one of: user input; a processor; a memory; a sensor; and/or a measuring device; and
    creating a combined IR image comprising said adjusted visible representation of said captured IR radiation information and said visible representation of additional information, wherein said projecting comprises projecting said combined IR image onto said observed real world scene.

21. The arrangement of claim 16, wherein detecting said distance information comprises:
    retrieving at least one distance from-said thermography arrangement to said observed real world scene; and
    calculating at least one length and/or a size of an area in said observed real world scene based on said retrieved distance.

22. The arrangement of claim 21, wherein more than one distance is retrieved and the more than one distance are used to create a distance map or distance image, wherein the distances of the distance map or distance image are used to adjust the visible representation of the captured IR radiation information such that the visible representation of the captured IR radiation information, when projected, is aligned with the observed real world scene at different depths dependent on the distance map, and wherein the operations further comprise projecting pixels of the visible representation with varying density, dependent on the distances of the distance map, or distance image, and preset conditions.

* * * * *

UNITED STATES PATENT AND TRADEMARK OFFICE
CERTIFICATE OF CORRECTION

PATENT NO. : 9,835,445 B2
APPLICATION NO. : 14/473976
DATED : December 5, 2017
INVENTOR(S) : Katrin Strandemar et al.

It is certified that error appears in the above-identified patent and that said Letters Patent is hereby corrected as shown below:

In the Claims

In Column 39, Line 57, change "scene wherein" to --scene where--.

In Column 40, Line 1, change "adjusted visible light-representation" to --adjusted visible representation--.

Signed and Sealed this
Twenty-eighth Day of May, 2019

Andrei Iancu
*Director of the United States Patent and Trademark Office*